US011919014B2

(12) United States Patent
Boily

(10) Patent No.: US 11,919,014 B2
(45) Date of Patent: Mar. 5, 2024

(54) NOZZLE ASSEMBLY

(71) Applicant: Sonny's HFI Holdings, LLC, Wilmington, DE (US)

(72) Inventor: Jeff Boily, Eagan, MN (US)

(73) Assignee: Sonny's HFI Holdings, LLC., Wilmington, DE (US)

( * ) Notice: Subject to any disclaimer, the term of this patent is extended or adjusted under 35 U.S.C. 154(b) by 431 days.

(21) Appl. No.: 17/155,239

(22) Filed: Jan. 22, 2021

(65) Prior Publication Data

US 2021/0252531 A1 Aug. 19, 2021

Related U.S. Application Data

(60) Provisional application No. 62/975,949, filed on Feb. 13, 2020.

(51) Int. Cl.
*B05B 1/34* (2006.01)

(52) U.S. Cl.
CPC .................................. *B05B 1/3402* (2018.08)

(58) Field of Classification Search
CPC ..... B05B 1/3402; B05B 1/083; B05B 3/0463; B05B 3/16
See application file for complete search history.

(56) References Cited

U.S. PATENT DOCUMENTS 2,706,108 A 4/1955 Miner
3,377,139 A 4/1968 MacGregor et al.
3,388,868 A 6/1968 Watson et al.
3,730,440 A 5/1973 Parkison
3,941,355 A 3/1976 Simpson
4,069,976 A 1/1978 Chauvigne
4,253,608 A 3/1981 Hunter
4,869,849 A 9/1989 Hirose et al.
5,098,021 A 3/1992 Kah, Jr.
5,160,086 A 11/1992 Kuykendal et al.
5,169,065 A * 12/1992 Bloch ..................... B26F 3/004 239/590.5
5,213,260 A 5/1993 Tonkinson
5,404,957 A 4/1995 McCormack (Continued)

OTHER PUBLICATIONS

International Search Report and Written Opinion dated Aug. 10, 2021 in connection with International Patent Application No. PCT/US2021/031339, 12 pages.

(Continued)

*Primary Examiner* — Steven M Cernoch
(74) *Attorney, Agent, or Firm* — Dorsey & Whitney LLP

(57) ABSTRACT

Nozzle assemblies adapted to produce a laminar fluid flow and maintain the laminar fluid flow over a substantial distance facilitate cleaning of a confined space, such as a sewer vault, without personnel entry into the confined space, and include a housing having an inlet, an outlet, and an internal channel extending between the inlet and the outlet. The nozzle assembly can further include a flow straightener assembly within the internal channel. The flow straightener assembly can have a first section with a first plurality of tubes fluidly connected to the inlet, and a second section with a second plurality of tubes fluidly connected to the first plurality of tubes and the outlet. A quantity of the first plurality of tubes is different than a quantity of the second plurality of tubes.

13 Claims, 15 Drawing Sheets

(56) References Cited

U.S. PATENT DOCUMENTS

| | | | |
|---|---|---|---|
| 6,273,512 B1 | 8/2001 | Rajewski | |
| 6,460,734 B1 | 10/2002 | Schroeder et al. | |
| 6,471,146 B1 | 10/2002 | Kuykendal et al. | |
| 8,022,485 B2 | 9/2011 | Davies | |
| 8,500,042 B2 | 8/2013 | Brown et al. | |
| 8,544,567 B2 | 10/2013 | Comeau et al. | |
| 8,740,450 B2 | 6/2014 | Mogami et al. | |
| 9,132,393 B1 | 9/2015 | Ross | |
| 9,370,754 B2 | 6/2016 | Mcclimond | |
| 9,433,954 B2 | 9/2016 | Analetto et al. | |
| 9,714,010 B2 | 7/2017 | Fazio et al. | |
| 9,731,303 B2 | 8/2017 | Harris et al. | |
| 2001/0054515 A1 | 12/2001 | Eddison et al. | |
| 2003/0209611 A1 | 11/2003 | Harris et al. | |
| 2003/0212149 A1 | 11/2003 | Grundmann et al. | |
| 2010/0276820 A1 | 11/2010 | Mogami et al. | |
| 2012/0018218 A1 | 1/2012 | Rosenhauch | |
| 2013/0025169 A1 | 1/2013 | Mccarty et al. | |
| 2014/0042245 A1 | 2/2014 | Buckner | |
| 2014/0291873 A1 | 10/2014 | McClimond | |
| 2015/0184806 A1* | 7/2015 | Beg | E21B 41/0071 138/40 |
| 2015/0273489 A1 | 10/2015 | Harris et al. | |
| 2018/0304285 A1 | 10/2018 | Mcclimond | |
| 2021/0316258 A1 | 10/2021 | Folk et al. | |
| 2021/0346895 A1 | 11/2021 | Schuller et al. | |
| 2022/0288612 A1 | 9/2022 | Balzer et al. | |

OTHER PUBLICATIONS

International Search Report and Written Opinion dated Sep. 1, 2022 in connection with International Patent Application No. PCT/US2022/019509, 16 pages.

* cited by examiner

NOZZLE ASSEMBLY

CROSS-REFERENCE TO RELATED APPLICATIONS

This application claims priority to U.S. Provisional Patent Application No. 62/975,949, filed Feb. 13, 2020, entitled "Nozzle Assembly," which is incorporated by reference herein, in the entirety and for all purposes.

FIELD

The described embodiments relate generally to high-performance nozzles, and more particularly, to nozzles that induce laminar fluid flow.

BACKGROUND

Nozzles can be used to converge and direct fluid flow toward an intended target. In many traditional systems, fluid emitted from the nozzle can dissipate prematurely, before the flow reaches the intended target. Flow straighteners can be arranged in the nozzle to induce a laminar fluid flow. Conventional flow straighteners suffer from significant drawbacks that limit the ability of the nozzle to produce and maintain a tight and controlled fluid stream. At distances common to cleaning operations, such as cleaning a partially underground sewer vault or lift station, for example, conventional nozzles can produce a stream that dissipates into a mist within the vault, thus reducing the ability to clean the vault without personnel entry into a confined and potentially hazardous space. As such, the need continues for systems and techniques to facilitate enhanced laminar fluid flow.

SUMMARY

Embodiments of the present invention are directed to nozzle assemblies, and methods of manufacture thereof. The nozzle assemblies facilitate delivery of a substantially laminar fluid stream, and maintenance of the laminar fluid for a target distance, including maintenance of the laminar fluid stream for at least 20 feet, at least 30 feet, or greater, from an outlet of the nozzle assembly. To facilitate the foregoing, the nozzle assemblies are adapted to direct fluid flow through ducts or elongated passages arranged therein to induce laminar flow. The nozzle assemblies have multiple sections, arranged serially in the nozzle assembly, and each has a quantity of ducts that is different from a quantity of ducts in an adjacent section. The progression of fluid flow through the multiple sections and associated ducts produces a fluid stream that can remain tightly controlled or otherwise intact at longer distances than conventional designs, facilitating cleaning of confined spaces, such as a sewer vault or lift station, without necessitating personnel entry.

In a first example, a nozzle assembly is disclosed. The nozzle assembly includes a housing having an inlet, an outlet, and an internal channel extending between the inlet and the outlet. The nozzle assembly further includes a flow straightener assembly within the internal channel. The flow straightener assembly has a first section with a first plurality of tubes fluidly connected to the inlet, and a second section with a second plurality of tubes fluidly connected to the first plurality of tubes and the outlet. The first plurality of tubes is different than the second plurality of tubes.

In a second example, another nozzle assembly is disclosed. The nozzle assembly includes a housing having an inlet, an outlet, and an internal channel defining an elongated region of the nozzle assembly along a flow direction between the inlet and the outlet. The nozzle assembly includes a collection of ducts within the internal channel and extending along the flow direction for a subset of the elongated region. A quantity of the collection of ducts in the housing alternates along the flow direction. Further, ducts of the collection of ducts are discontinuous with one another at a change in the quantity of the collection of ducts along the elongated region.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
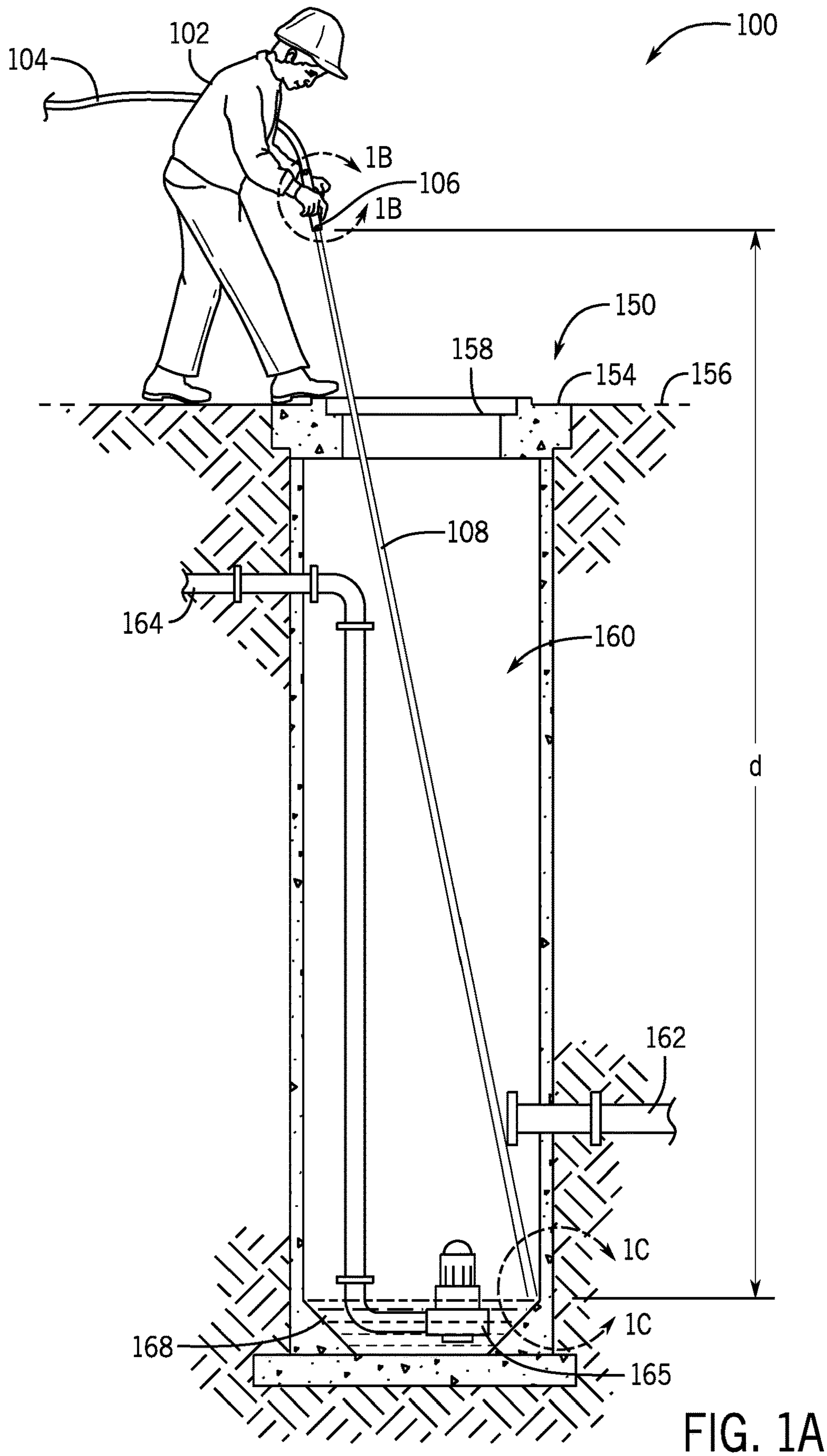
FIG. 1A depicts a sample cleaning operation using one or more nozzles of the present disclosure.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes systems, methods, and apparatuses that embody various elements of the present disclosure. However, it should be understood that the described disclosure may be practiced in a variety of forms in addition to those described herein.

The present disclosure describes nozzle assemblies that facilitate production of a substantially laminar fluid flow, and maintenance of the laminar fluid flow across a target distance or range. Nozzle assemblies of the present disclosure can be adapted to produce a substantially laminar fluid flow and maintain the fluid flow as a tight, intact, and/or controlled stream for at least 20 feet, for at least 30 feet, or for at least a greater distance from the nozzle assembly. As used herein "laminar" fluid flow can refer to a flow that that is smooth, orderly, with fluid particles generally moving relative to one another along a direction of flow with little to no mixing, in contrast to turbulent flow which may produce rough or dissipated flow patterns.

The substantially laminar fluid flow produced by the nozzle assembly of the present disclosure is therefore an intact and concentrated stream of fluid at the target distance. This can allow the nozzle assembly to be used in industrial or municipal settings requiring high pressure water streams that remain intact over long distances. As one example, the nozzle assembly is used for cleaning operations in confined spaces, such as a sewer vault or lift station. The nozzle assembly can be adapted to direct the fluid flow through a collection of tubes or ducts defined therethrough to induce laminar flow. The collection of tubes or ducts alternates in quantity along a length of the nozzle assembly. The nozzle assembly is adapted to pass fluid through distinct stages or sections defining the alternating quantity of tubes or ducts to produce a substantially laminar fluid stream. The substantially laminar fluid stream can be used for cleaning operations, such as high-pressure cleaning operations of confined spaces, including sewer vaults and lift stations. However, such confined spaces can extend into the ground by at least 20 feet, by at least 30 feet, or by at least a greater depth, and thus include debris and other contaminants at these or greater depths that require a substantially intact stream of fluid for satisfactory cleaning.

The nozzle assemblies, systems, and methods of manufacture of the present disclosure may mitigate such hindrances by producing a fluid stream that can remain intact as it travels fully into the confined space. In this way, the nozzle assembly can be used to clean the confined space without requiring personnel to enter the confined space. For example, a worker can stand outside of the confined space and use the nozzle assembly to advance a substantially laminar fluid flow into the confined space to a complete depth or other cross-dimension of the confined space. To facilitate the foregoing, the nozzle assembly can employ one or more flow straightener assemblies that operate to induce laminar flow. A flow straightener assembly can be arranged along a flow path of the fluid in the nozzle, and include a first plurality of tubes and a second plurality of tubes. The first and second plurality of tubes can be arranged within the nozzle assembly such that the nozzle assembly directs fluid flow through each of the plurality of tube sequentially or otherwise in series. The first plurality of tubes can be defined by a different quantity of tubes than the second plurality of tubes. For example, the first plurality of tubes can include a greater quantity of tubes than the second plurality of tubes, such as where the first plurality of tubes is defined by seven tubes, and the second plurality of tubes is defined by three tubes. The alternating quantity of tubes cooperate to induce and maintain the substantially laminar fluid flow across the target distance.

In an example, the nozzle assembly includes multiple flow straightener assemblies. For example, the nozzle assembly can include two flow straightener assemblies, three flow straightener assemblies, four flow straightener assemblies, or more. Each of the flow straightener assemblies can have a first section and a second section, each with a distinct quantity of tubes arranged therein. For example, each of the multiple flow straightener assemblies can have a first section with a collection of a first quantity of tubes, and a second section with a collection of a second quantity of tubes different from the first quantity. Where the first quantity is three tubes and the second quantity is seven tubes, the flow straightener assemblies can alternate between seven tubes, three tubes, seven tubes, three tubes, and so on, as appropriate for a given application. The multiple flow straightener assemblies can be fluidly coupled with one another in series and arranged within a housing of the nozzle assembly. The housing can be a two-part housing and have an inlet through which fluid is introduced to a first of the multiple flow straightener assemblies, and an outlet at which flow is emitted from the multiple flow straightener assemblies at a nozzle or tip of the nozzle assembly. Although the sections of the flow straightener assemblies are described as including tubes, the sections may include conduits or openings extending through the sections defining multiple, parallel fluid pathways, and for instance, may be formed by injection molding, machining, casting, and so on.

In another example, the nozzle assembly can include at least one flow straightener assembly including elongated tubes. For example, the flow straightener assembly can have a first and a second section, each including a distinct or alternating quantity of elongated tubes. In this example, flow can enter the nozzle assembly through the nozzle inlet in the housing and advance to a first stage of the flow straightener assembly and through a collection of a first quantity of elongated tubes. Flow can then subsequently advance to a second stage of the flow straightener assembly and through a collection of a second quantity of elongated tubes different from the first quantity. The first quantity of tubes may be 2, 3, 4, 5, 6, 7, 8, 9, 10 or more tubes, while the second quantity of tubes may be different from the first quantity of tubes and may also include 2, 3, 4, 5, 6, 7, 8, 9, 10 or more tubes, as long as the second quantity of tubes differs from the first quantity. In a particular example, the first quantity of tubes may be 3, and the second quantity of tubes may be 7. A length of the elongated tubes can be substantially greater than a width of the nozzle assembly. In some cases, the lengths of the elongated tubes can be at least 30%, or at least 35%, or at least 40%, or a greater percent of the total length of the nozzle assembly. After exit from the three elongated tubes, the fluid flow can exit the nozzle via the nozzle tip at the outlet.

While many arrangements are possible and are contemplated herein, the tubes of the present disclosure can generally be discrete, thin-walled tubes of substantially the same length that are associated with a receiving structure of the nozzle assembly having a corresponding length. Thin-walled tubes may be shaped as a cylinder of circular, oval, triangular, or other geometric shape. As one illustration, a collection of thin-walled tubes, such as a collection of three tubes, seven tubes, or another quantity of tubes, can be inserted into a shell in a manner to form a press-fit connection among the tubes and the interior of the shell, impeding the release of the tubes from the shell to form a flow straightener. Additionally or alternatively, the tubes can be associated with the shell using adhesives, threads, or welding, among other retention techniques. Accordingly, it will be appreciated that while the tubes and the shell and other components of the flow straightener assemblies are described herein as being associated with one another via a press-fit, other retention techniques can be used without departing form the scope and spirit of the disclosure. Continuing the non-limiting illustration, the shell may be a relatively larger tube compared to the thin-walled tubes and be configured to receive the plurality of tubes. In some examples the shell may be shaped as a cylinder of circular, oval, triangular, or other geometric shape. The shell with the tubes associated therein, referred to as a flow straightener, can be associated with an insert or body of the flow straightener assembly for association with the housing and nozzle assembly.

The flow straighteners of the disclosed nozzle assemblies may have the same length relative to each other, or may differ in length. For instance, each flow straightener may be 0.5 in. long to 6 in. long. When the lengths differ, one flow straightener may have a first length and the second may have a length that is about 0.5 to 6 in. longer than the first. Subsequent flow straighteners may have the same or different lengths than the first and second flow straighteners, for example.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1A depicts a sample cleaning operation 100. In the sample cleaning operation 100, a worker 102 is shown cleaning a lift station using a nozzle assembly 106, such as one or more of the nozzle assemblies discussed above and described in greater detail below. The nozzle assembly 106 can be fluidly connected to a conduit 104 or other fluid supply that provides fluid to nozzle assembly 106. The nozzle assembly 106 emits a stream 108, which can be a substantially laminar fluid flow, into the lift station for cleaning.

For purposes of illustration, the lift station 150 is shown as including a vault 154 extending into ground 156. The vault 154 can be a confined space with an opening 158 extending into a chamber 160 of the vault 154. The worker 102 is shown positioned outside of the chamber 160 and using the nozzle assembly 106 to emit the stream 108 into the vault 154 in order to clean the vault 154 without requiring entry of the worker 102. For example, the lift station 150 may be used to move liquid 168 or waste from an elevation of a process inlet 162 to an elevation of a process outlet 164 via pumping components 165. The lift station 150 can require maintenance from time to time, such as cleaning, including cleaning the pumping components 165 located substantially at or adjacent to a bottommost portion of the vault 154.

The nozzle assembly 106 can be used to deliver a stream of intact flow to the bottommost portion of the vault 154. For example, the nozzle assembly 106 can be adapted to produce and maintain a substantially laminar fluid flow for a distance d shown in FIG. 1A. The distance d can be at least 20 feet, at least 30 feet, at least 40 feet, or greater, depending on the application of the lift station 150 or other use of the nozzle assembly 106. Further, the nozzle assembly 106 operates to maintain the substantially laminar flow along the distance d for a flow rate of between about 10 gallon per minute and about 50 gallons per minute, such as for a flow rate of preferably between about 20 gallons per minute and about 40 gallons per minute, and more preferable for at least about 25 gallons per minute. Yet further, the nozzle assembly 106 operates to maintain the substantially laminar flow along the distance d for fluid pressure at the nozzle assembly of at least 400 pounds per square inch. In some cases, however, the pressure can be substantially greater, such as being as high as 1,000 pounds per square inch, 2,500 pounds per square inch, or greater. In this regard, the nozzle assembly 106 can operate to maintain the substantially laminar flow along the distance d for a range of fluid pressures, such as where the fluid pressure is within a range of substantially between 1,000 pounds per square inch to 2,500 pounds per square inch.

Figure 1B:
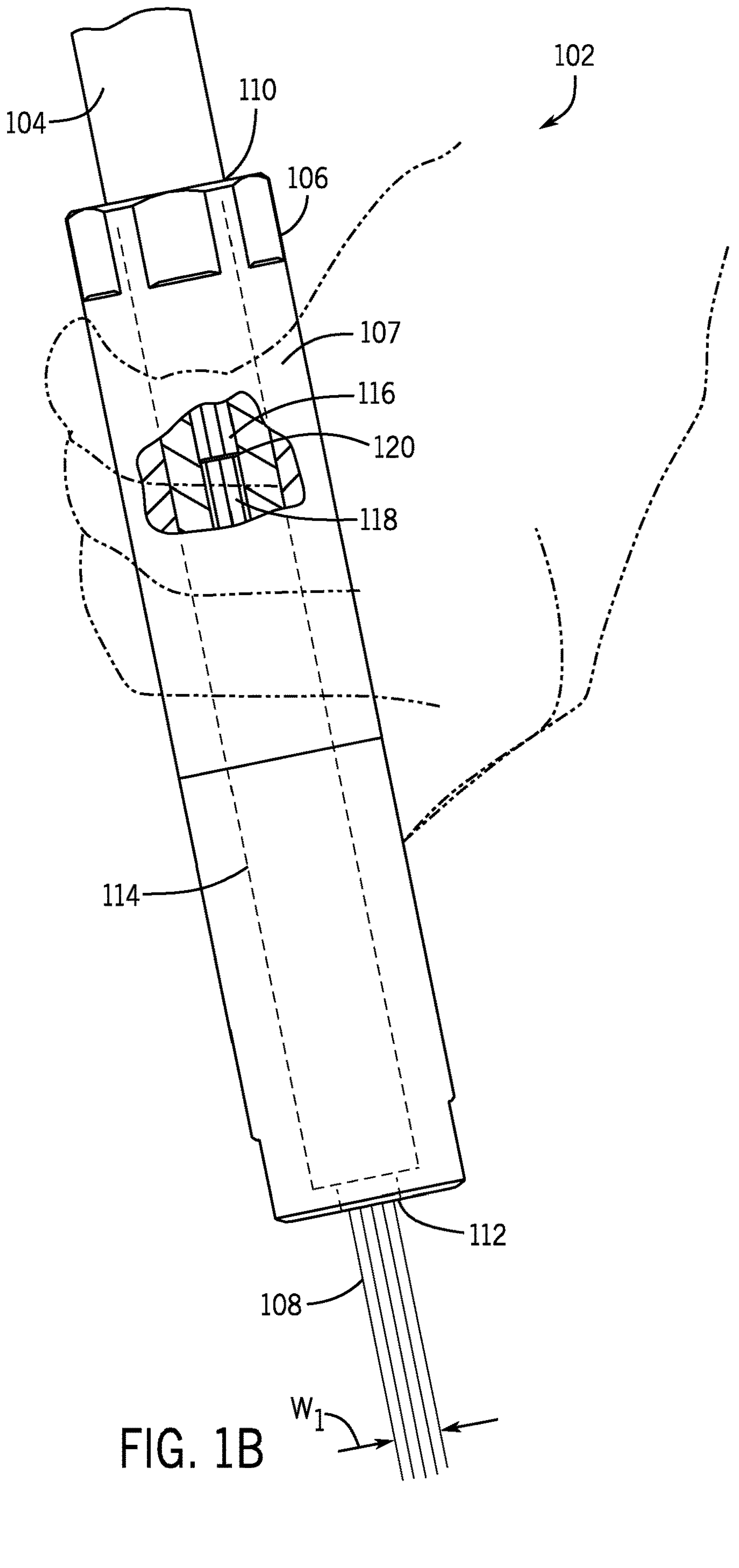
FIG. 1B depicts detail 1B-1B of FIG. 1A showing the nozzle of FIG. 1A with multiple flow straightening stages.

With reference to FIG. 1B, detail 1B-1B of FIG. 1A is shown depicting the nozzle assembly 106 producing the stream 108 from fluid provided by the conduit 104. The nozzle assembly 106 can produce the stream 108 having the substantially laminar properties along the distance d described above. This is due in part to the nozzle assembly 106 directing the fluid through a series of tubes that alternate in quantity along a length of the nozzle assembly.

To illustrate, FIG. 1B shows the nozzle assembly 106 including a housing 107, with an internal channel 114 extending between an inlet 110 and an outlet 112 of the housing 107. Shown in partial cutaway in FIG. 1B, the housing 107 can receive a first plurality of tubes 116 and a second plurality of tubes 118 within the internal channel 114. The first plurality of tubes 116 can be fluidly connected with the inlet 110 and the second plurality of tubes 118 can be fluidly connected to the first plurality of tubes 116 and the outlet 112. The quantity of the first plurality of tubes 116 can be different than the quantity of the second plurality of tubes 118, such as where the first plurality of tubes 116 includes at least seven tubes, and the second plurality of tubes 118 includes at least three tubes. The first and second plurality of tubes 116 and 118 can define ducts along the flow direction of fluid entering the nozzle assembly 106, through which the fluid passes through to reach the outlet 112. The flow can also traverse or pass through a discontinuity 120 in the ducts, which can be defined by a transition between the first plurality of tubes 116 and the second plurality of tubes 118. In passing through this alternating quantity of tubes, the stream 108 emitted by the nozzle assembly 106 at the nozzle egress can have a width $w_1$, be substantially laminar, and can exhibit the substantially laminar flow, such as being tight, controlled, intact, along the entire distance d.

Figure 1C:
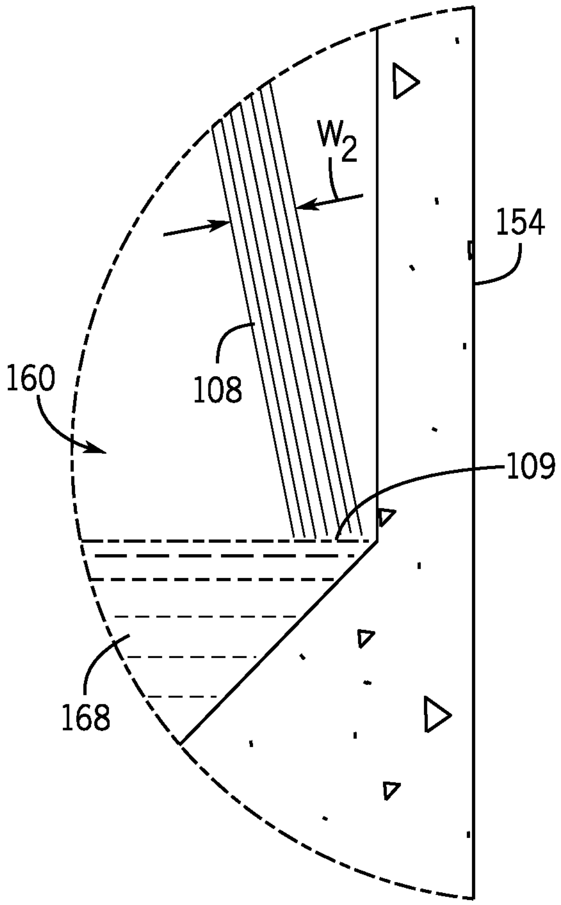
FIG. 1C depicts detail 1C-1C of FIG. 1A showing a stream emitted from the nozzle of FIG. 1A being intact after traversing a substantial distance.

For example and as shown with reference to FIG. 1C, detail 1C-1C is shown of FIG. 1A. In FIG. 1C, the stream 108 is shown at a point of contact 109 within the vault 154. The stream 108 can exhibit a width $w_2$. In some cases, the width $w_2$ can be representative of an intact, controlled flow of the stream 108 and can be substantially similar as width $w_1$ at the nozzle egress. In some cases, the width $w_2$ can be slightly larger than the width $w_1$. For example, as the stream 108 advances along the distance d, the width of the stream 108 can increase such that the width $w_2$ is at least 5% greater, at least 10% greater, at least 15% greater, or is otherwise greater in dimension than the width $w_1$. Notwithstanding the potential increase in width of the stream 108, the stream 108 can still exhibit a substantially laminar flow at the width $w_2$. In this manner, the nozzle assembly 106 can be used to clean the vault 154, such as reaching the liquid 168 at the bottommost portion of the vault 154, without the worker 102 entering the vault 154.

Figure 2:
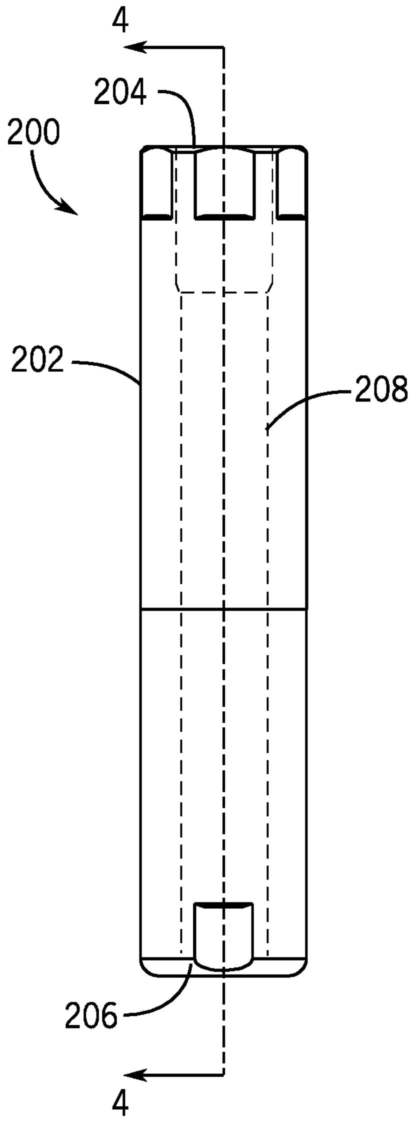
FIG. 2 depicts an implementation of a nozzle assembly according to the present disclosure.

Turning to FIG. 2, an implementation of a nozzle assembly 200 is shown. The nozzle assembly 200 can be substantially analogous to the nozzle assembly 106 described above with respect to FIGS. 1A-1C. For example, the nozzle assembly 200 can include collections of tubes arranged serially therein, and alternating in quantity, to produce and maintain a substantially laminar fluid flow.

In the implementation of FIG. 2, the nozzle assembly 200 is shown having a housing 202. The housing 202 can form an outer protective structure of the nozzle assembly that is arranged to route fluid toward and through the collections of tubes arranged therein. For example, the housing 202 can define an inlet 204 at a first end of the housing 202 and an outlet 206 at a second opposing end of the housing 202. Broadly, the nozzle assembly 200 can receive fluid at the inlet 204 (e.g., via a conduit or other fluid supply) and can emit fluid at the outlet 206. The housing 202 can define an internal channel 208 (shown in phantom in FIG. 2) between the inlet 204 and the outlet 206 for receiving the collections of tubes.

Figure 3:
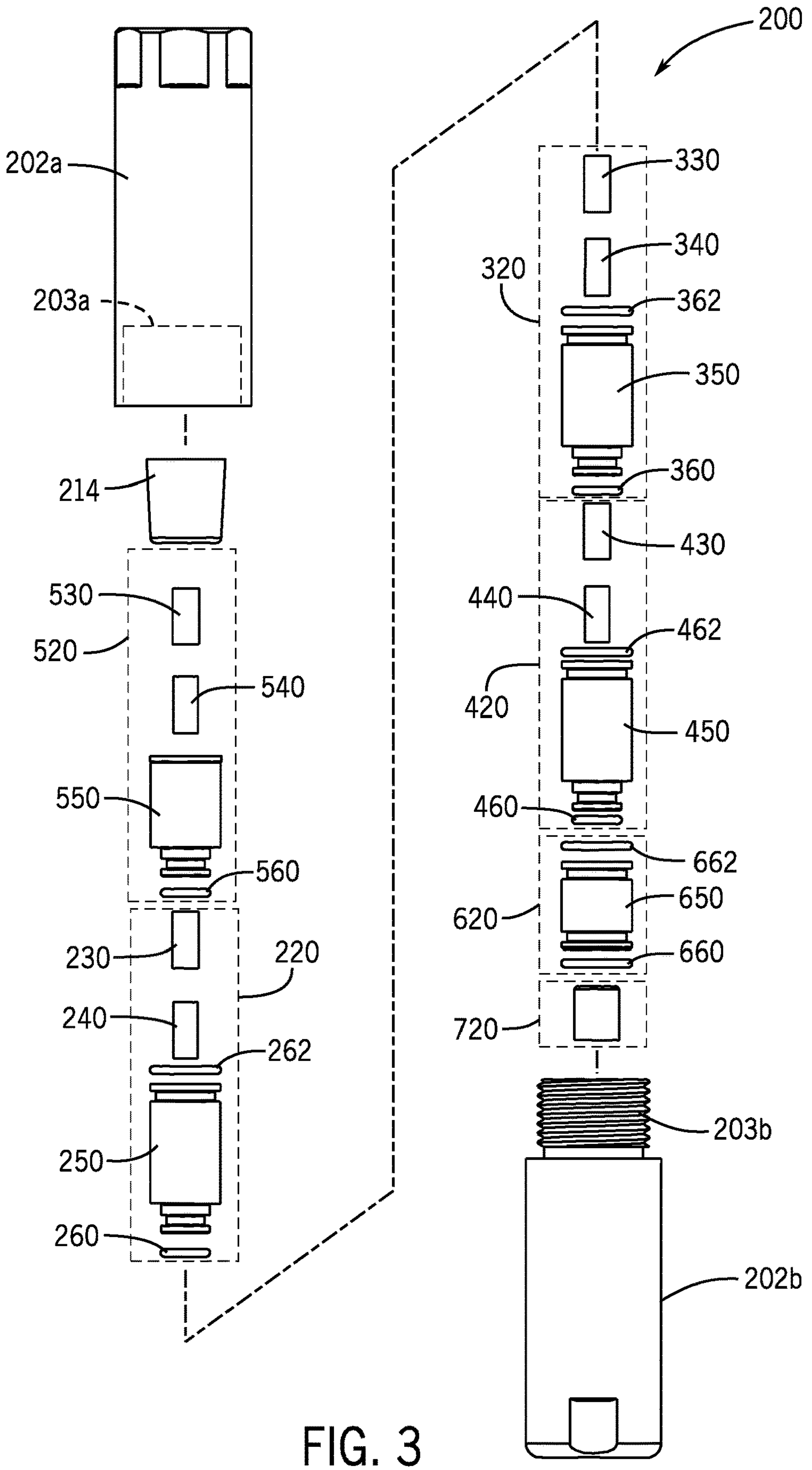
FIG. 3 depicts an exploded view of the nozzle assembly of FIG. 2.

With reference to FIG. 3, an exploded view of the nozzle assembly 200 is shown. In this exploded view, the housing 202 is shown as being defined by a first housing portion 202*a* and a second housing portion 202*b*. The first and second housing portions 202*a*, 202*b* can be removably associated with one another and cooperate to define the internal channel 208. For example, the first housing portion 202*a* can define a first engagement structure 203*a* and the second housing portion 202*b* can define a second engagement structure 203*b* that can secure the first and second housing portions 202*a*, 202*b* to one another and facilitate removal, as needed. In the example of FIG. 3, the first and second engagement structures 203*a*, 203*b* can be complementary threads and receiving grooves; however, other structures are possible, including using fasteners, pins, or weld to attach the housing portions 202*a*, 202*b*. Yet in other examples, the housing 202 can be an integrally formed, one-piece structure.

In FIG. 3, the nozzle assembly 200 includes multiple flow straightener assemblies. Each of the flow straightener assemblies includes a first plurality of tubes and a second plurality of tubes having a different quantity of tubes compared to the first plurality of tubes. For purposes of illustration, the nozzle assembly 200 includes a first flow straightener assembly 220, a second flow straightener assembly 320, a third flow straightener assembly 420, and a fourth flow straightener assembly 520. The first flow straightener assembly 220, the second flow straightener assembly 320, the third flow straightener assembly 420, and the fourth flow straightener assembly 520 are fluidly connectable with one another and arranged along a fluid flow path that extends between the inlet 204 and the outlet 206. For example, the flow straightener assemblies 220, 320, 420, 520 can be fluidly connected with one another and arranged in series within the internal channel 208 of the housing 202. In this regard, fluid entering the nozzle assembly 200 at the inlet 204 passes through each of the flow straightener assemblies 220, 320, 420, 520 and the associated plurality of tubes within each straightener.

With specific reference to the first flow straightener assembly 220, this assembly can include at least a first flow straightener 230, a second flow straightener 240, an insert 250, a first sealing feature 260, and a second sealing feature 262. The first flow straightener 230 includes a first collection of ducts extending therethrough and the second flow straightener 240 includes a second collection of ducts extending therethrough. In some cases, as shown herein at FIGS. 5 and 6, the first and second collection of ducts can be defined by corresponding first and second plurality of tubes arranged within the respective one of the first and second flow straighteners 230, 240. In other cases, other constructions are possible, including forming one or more of the ducts through a solid block of material. The first and second flow straighteners 230, 240 are fluidly associatable with one another and arranged within the insert 250. The insert 250 generally defines a receiving structure for axially aligning the first and second flow straighteners 230, 240 with one another, and for subsequent assembly within the housing 202. For example, the insert 250 can be configured to be received within the internal channel 208 of the housing 202. To facilitate fluidic engagement with other flow straightener assemblies, the housing 202, and/or the nozzle tip, sealing features 260, 262, such as O-rings can be seated at opposing ends of the insert and be used to establish a substantial fluid-tight connection between an adjacent engaged component.

Each insert 250 may include two, e.g., flow straighteners 230, 240, or three or more flow straighteners, each having a discrete number of tubes that can be the same or a different from the other flow straighteners. For instance, the insert 250 may include a first flow straightener 230 including 2-10 tubes, a second flow straightener 240 including 2-10 tubes, and optional third, fourth, fifth flow straighteners, and so on, each including 2-10 tubes. In a particular example, a first flow straightener includes 2 tubes, a second includes 4 tubes, a third includes 6 tubes, a fourth includes 7 tubes, and a fifth includes 8 tubes. In another example a first flow straightener includes 2 tubes, a second includes 4 tubes, a third includes 3 tubes, a fourth includes 5 tubes, a fifth includes 4 tubes, and a sixth includes 9 tubes. In yet another example, a first flow straightener includes 3 tubes, a second includes 8 tubes, a third includes 3 tubes, and a fourth includes 8 tubes.

The second flow straightener assembly 320, the third flow straightener assembly 420, and the fifth flow straightener assembly 520 can be substantially analogous to the first flow straightener assembly 220. For example, each can include a first and second plurality of ducts or tubes through which fluid is directed for inducing a substantially laminar flow. In this regard, the second flow straightener assembly 320 is shown in FIG. 3 as including a first flow straightener 330, a second flow straightener 340, an insert 350, a first sealing feature 360, and a second sealing feature 362. Further shown in FIG. 3, the third flow straightener assembly 420 includes a first flow straightener 430, a second flow straightener 440, an insert 450, a first sealing feature 460, and a second sealing feature 462. And further shown in FIG. 3, the fourth flow straightener assembly 520 includes a first flow straightener 530, a second flow straightener 540, an insert 550, and a sealing feature 560. It will be appreciated that while the nozzle assembly 200 of FIG. 3 shows four flow straightener assemblies (e.g., the flow straightener assemblies 220, 320, 420, 520), more or fewer flow straightener assemblies may be implemented without departing from the spirit and scope of the present disclosure. For example one or more of the flow straightener assemblies 220, 320, 420, 520 may be omitted, or one or more flow straighteners may be added to present example, as may be appropriate for a given application.

The nozzle assembly 200 of FIG. 3 is also shown as including a screen feature 214. The screen feature 214 can be a perforated structure that is seated adjacent or substantially at the inlet 204. The screen feature 214 can help prevent the flow of contaminates into the nozzle assembly 200, such as into the internal channel 208, which can help avoid blockages within the plurality of tubes held therein. For example, the perforations can be smaller in cross-dimension than a cross-dimension of the tubes. As such, contaminates are blocked at the screen feature 214 before advancing toward and into the various flow straightener assemblies. The screen feature 214 can have a dome or cup-type shape or contour that collects contaminates, and that can be readily emptied for cleaning of the nozzle assembly 200. Additionally or alternatively, the screen feature 214 can be removed and replaced with a new screen feature as needed by the end user.

Downstream of the screen feature 214 and the flow straightener assemblies 220, 320, 420, 520, the nozzle assembly 200 is shown as including a transition portion 620 and a tip 720. The transition portion 620 can be associated with a first sealing feature 660 and a second sealing feature 662 and be fluidly engaged with the flow straightener assemblies 220, 320, 420, 520 within the housing 202. More broadly, the transition portion 620 defines a transition or adaptor between the flow straightener assemblies 220, 320, 420, 520 and the tip 720. For example and shown herein at FIG. 10, the transition portion 620 can receive the tip 720 and align the tip 720 relative to, for example, the third flow straightener assembly 420 such that flow from the straighteners progresses to the tip 720 and the outlet 206. In this regard, the tip 720 sits at or adjacent the outlet 206 and is used to define a flow stream (e.g., the stream 108 of FIGS. 1A-1C) as the fluid exits the nozzle assembly 200.

Figure 4:
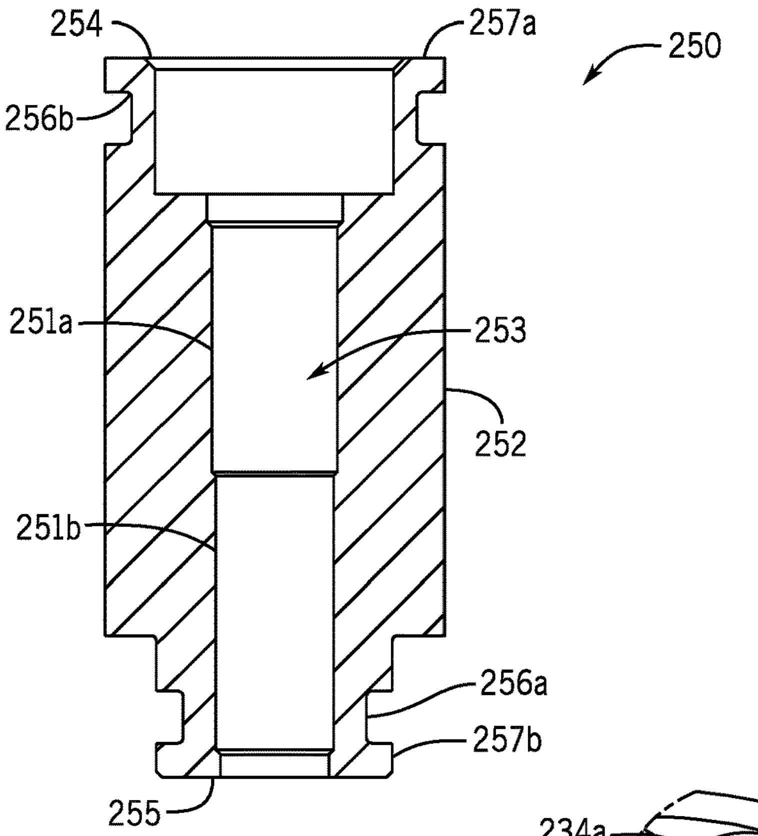
FIG. 4 depicts a cross-sectional view of an insert of the nozzle assembly, taken along line 4-4 of FIG. 2.

FIG. 4 depicts a cross sectional view of the insert 250, taken along line 4-4 of FIG. 2. The insert 250 has a body 252. The body 252 can be formed from a metal material. As shown in FIG. 4, the body 252 is a one-piece structure, however, in other examples, the body 252 can be formed from multiple components. The insert 250 is used to associate the first and second flow straighteners 230, 240 with the housing 202. In this regard, the body 252 can include a through portion extending through the body to define an internal channel 253 between a first end 257*a* and a second end 257*b* of the insert 250. The internal channel 253 is adapted to receive the first and second flow straighteners 230, 240. For example, the internal channel 253 can have at least a first section 251*a* adapted to receive the first flow straightener 230, and a second section 251*b* adapted to receive the second flow straightener 240.

The internal channel 253 can extend through the body 252 of the insert 250 between an insert inlet 254 at the first end 257*a* and an insert outlet 255 at the second end 257*b*. The insert inlet 254 can be fluidly associated with the inlet 204 of the housing 202 and the insert outlet 255 can be fluidly associated with the outlet 206 of the housing 202. In this regard, when received at the first and second sections 251*a*, 251*b*, the first and second flow straighteners 230, 240 can be fluidly associated with the inlet 204 and the outlet 206 through the respective ones of the insert inlet 254 and the insert outlet 255. A diameter of the internal channel 253 may be adapted to receive flow straighteners of different external diameters. For instance, flow straightener 230 may have a larger external diameter relative to flow straightener 240, and the first section 251*a* may have a diameter that is slightly larger than a diameter of the second section 251*b*. In such examples, the flow straightener 230 may have an external diameter that slightly smaller than the diameter of the first section 251*a* but is measurably larger compared to the diameter of the second section 251*b* and therefore only receivable in the first section 251*a*. Continuing with this example, the flow straightener 240 may have an external diameter that is measurably smaller than the diameter of the first section 251*a* and slightly smaller compared to the diameter of the second section 251*b*, and therefore can pass through the first section 251*a* and be seated in the second section 251*b*. In this example, the internal diameter of the flow straighteners 230, 240 may be the same such that fluid flows through the flow straighteners without experiencing turbulence between flow straightener 230 and 240. Similarly, the insert 250 egress may exhibit an internal diameter that is substantially the same as the internal diameter of the flow straighteners 230, 240.

While many constructions are possible, the body 252 is shown in FIG. 4 as including a first engagement structure 256*a* and a second engagement structure 256*b* that operate to facilitate the foregoing fluidic association. For example, the first and second engagement structures 256*a*, 256*b* can be grooves formed along an exterior of the body 252 and encircling or otherwise defining an annular region about the respective insert inlet 254 and insert outlet 255. The grooves can be machined or formed into the exterior surface and adapted to receive O-rings or other sealing features, including the sealing features 260, 262 shown in FIG. 3.

Figure 5:
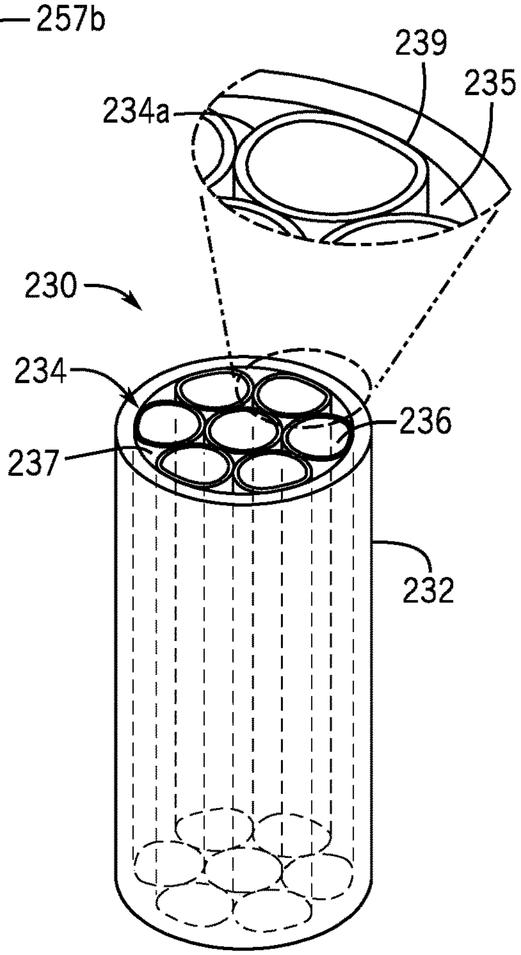
FIG. 5 depicts a first flow straightener having a first plurality of tubes arranged therein.

With reference to FIG. 5, the first flow straightener 230 is shown. The first flow straightener 230 is shown as including a shell 232 and a first plurality of tubes 234. The first plurality of tubes 234 can define a corresponding collection of ducts 236. The first plurality of tubes 234 can include seven separate tubes that extend through an interior 237 of the shell 232, such as complete through the interior 237 and between opposing ends of the shell 232. Each tube of the first plurality of tubes 234 can be a thin-walled tube and be formed from a deformable metal material. As one example, the tubes 234 can have a wall thickness of about 0.005 inches; however, other dimensions possible, including example, where the wall thickness can be substantially around 0.001 inches to about 0.010 inches, or greater as may be appropriate for a given application. The tubes 234 can be grouped together in a collection shown in FIG. 5 and arranged in the interior 237 of the shell 232. When associated therein, gaps 235 can be established between individual ones of the plurality of tubes 234 as shown in the detail of FIG. 5. The gaps 235 can also extend completely through the shell 232 and allow fluid to pass between the opposing ends of the shell 232, via the gaps 235.

One or more or all of the first plurality of tubes 234 can deform to facilitate the press-fit connection of the tubes 234 and the shell 232. For example and as shown in the detail of FIG. 5, a given tube 234*a* is shown slightly deformed and establishing a connection 239 with the shell 232 at the interior 237. The connection 239 can be a press-fit connection. This may reduce or eliminate excess fasteners and welds, while providing a secure association between the tubes 234 and the shell 232. Additionally or alternatively, adhesives, welding, threads and/or other retention techniques can be used, which may or may not result in the slight deformation of the given tube 234*a* in the shell 232 shown in FIG. 5.

Figure 6:
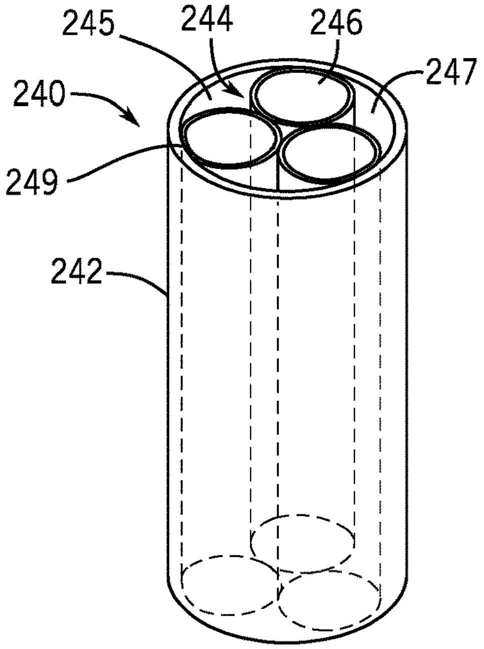
FIG. 6 depicts a second flow straightener having a second plurality of tube arranged therein.

With reference to FIG. 6, the second flow straightener 240 is shown. Similar to the first flow straightener 230, the second flow straightener 240 includes a shell 242, a second plurality of tubes 244, a second collection of ducts 246, gaps 245, a shell interior 247, and a press-fit connection 249. Notwithstanding, the second plurality of tubes 244 includes a different quantity of tubes than the first plurality of tubes 234. For example, the second plurality of tubes 244 can include three separate tubes of thin-walled construction that are press fit into the shell 242. Accordingly, whereas the first collection of ducts 236 includes seven ducts, the second collection of ducts 246 includes three ducts. In other cases, the second plurality of tubes 244 and second collection of ducts 246 can be defined by more than three tubes, including being defined by more than seven tubes, as may be appropriate for a given application.

Figure 7:
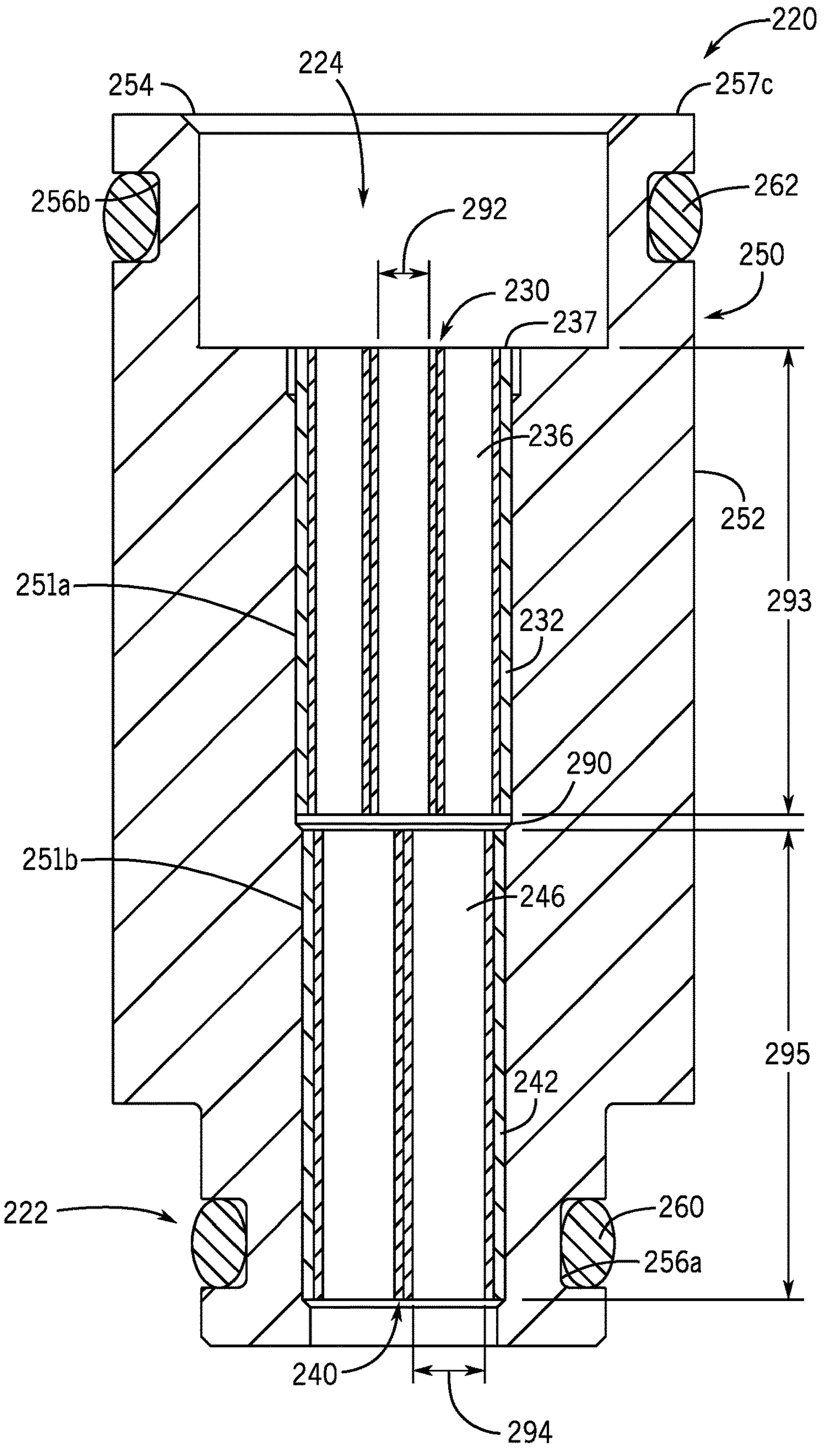
FIG. 7 depicts a cross-sectional view of a flow straightener assembly including the first flow straightener and the second flow straightener arranged within the insert, taken along line 4-4 of FIG. 2.

Turning to FIG. 7, a cross-sectional view of the flow straightener assembly 220 is shown, taken along line 4-4 of FIG. 2. In FIG. 7, the first flow straightener 230 is arranged in the first section 251*a* of the insert 250. Further, the second flow straightener 240 is arranged in the second section 251*b* of the insert 250. In the configuration of FIG. 7, the first and second flow straighteners 230, 240 can be arranged substantially adjacent one another within the internal channel 253. While many constructions are possible, the tubes 234, 244 can generally exhibit a diameter to length ratio of about at least 1 to 5. For example, the length of the tubes 234, 244, can have a value that is at least about five times the value of a diameter of a respective one of the tubes 234, 244. In this regard, the tubes 234, 244 can be defined as elongated tubes. It will be appreciated, however, that in some cases the length of the tubes 234, 244 can be greater than five times the value of the diameter such as being six, seven, or eight times the value of the diameter.

In the example of FIG. 7, the tubes of the first plurality of tubes 234 are shown as having a diameter 292 and the tubes of the second plurality of tubes 244 are shown as having a diameter 294. The diameter 292 is less than the diameter 294, for example, in order to accommodate seven distinct tubes within the shell 232. For example, in one embodiment, the diameter 292 can be around 0.07 inches, and the diameter 294 can be around 0.095 inches. It will be appreciated, however, that is other cases, the diameter 292 can be more or less than 0.07 inches and the diameter 294 can be more or less than 0.095 inches, with the diameter 292 remaining greater than the diameter 294, as may be appropriate for a given application. The tubes 234 are shown as having a tube length 293 and the tubes 244 are shown as having a tube length 295. In the illustrated example, the tube lengths 293, 295 can be around 0.500 inches. In this regard, the tubes 234 can have a diameter to length ratio of around about 1 to 7, and the tubes 244 can have a dimeter to length ratio of around about 1 to 5. Accordingly, in certain other embodiments, the tube lengths 293, 295 can be modified in order to tune the diameter the length ratio, as needed for a given application.

In the configuration illustrated in FIG. 7, the first and second flow straighteners 230, 240 may be press fit within the insert 250 or otherwise associated in the internal channel 253 so that fluid cannot pass between the external surface of the flow straighteners 230, 240 and the surface of the internal channel 253. At an interface 290 between the flow straighteners 230, 240, the tubes of the first plurality of tubes 234 are substantially discontinuous with the tubes of the second plurality of tubes 244. In this regard, the interface 290 can define a fluid boundary at which fluid flow within the insert 250 traverses and transitions between flow straightener assemblies having different or alternating quantities of tubes.

FIG. 7 also shows the first sealing feature 260 associated with the first engagement structure 256*a*. Further, the second sealing feature 262 is associated with the second engagement structure 256*b*. The first sealing feature 260 can protrude slightly from an exterior surface of the insert 250 and be used to engage the housing 202 at the internal channel 208. The second sealing feature 262 can be positioned along a stepped portion 222 of the flow straightener assembly and can be used to engage another flow straightener assembly of the nozzle assembly 200. For example, the flow straightener assembly 220 defines a receiving zone 224 opposite the stepped portion 222. The stepped portion 222 can be adapted to be received by a receiving zone of another flow straightener assembly, thus establishing a fluid engagement between the flow straightener assembly 220 and another flow straightener assembly that receives the stepped portion 222.

Figure 8A:
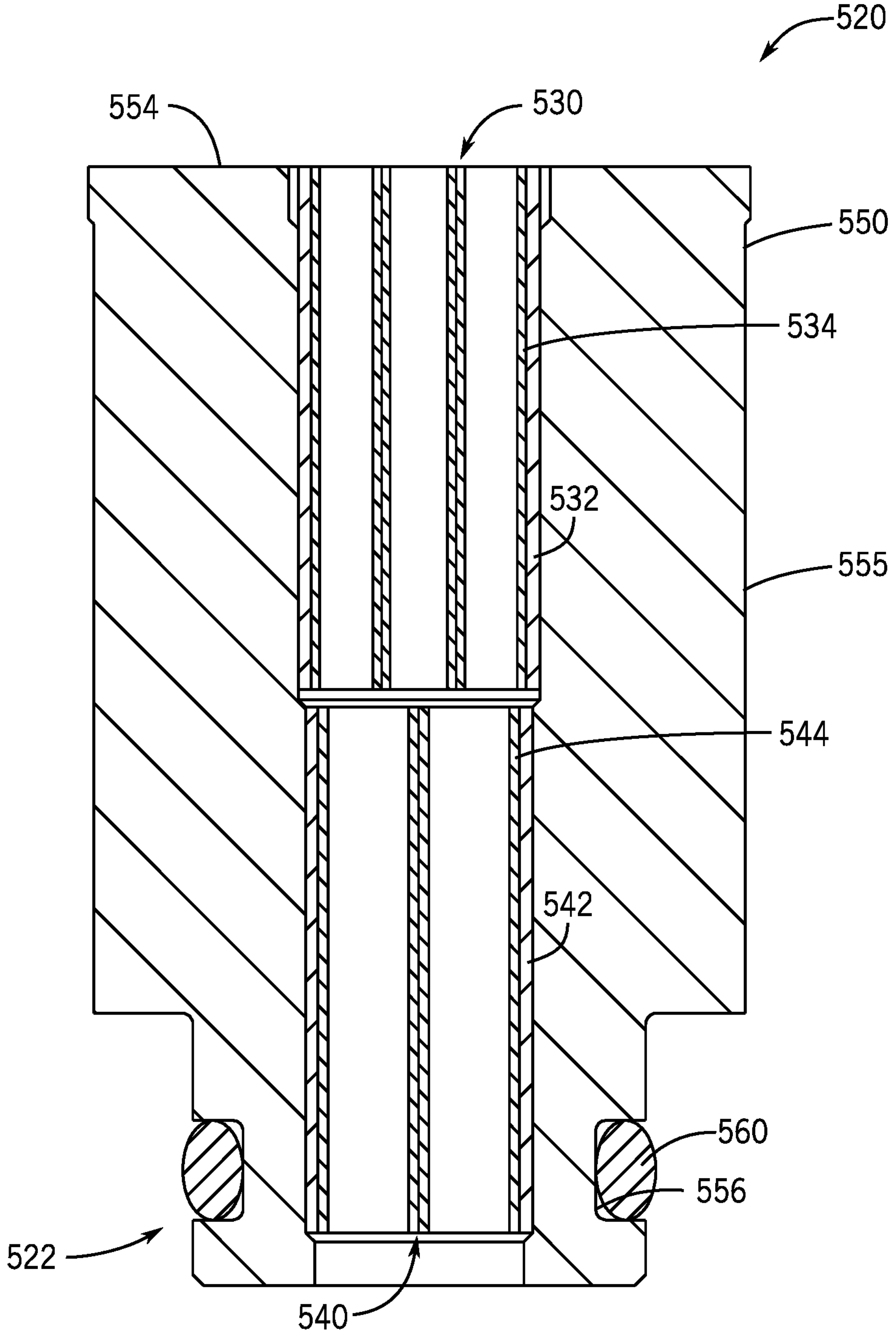
FIG. 8A depicts a cross-sectional view of another flow straightener assembly for an inlet of the nozzle of FIG. 2, taken along line 4-4 of FIG. 2.

At least one of the flow straightener assemblies of the nozzle assembly 200 can be adapted to be arranged at or adjacent the inlet 204. With reference to FIG. 8A, a cross-sectional view of the fourth flow straightener assembly 520 is shown, taken along line 4-4 of FIG. 2. The fourth flow straightener assembly 520 can be substantially analogous to flow straightener assembly 220 and can include the first flow straightener 530, a shell 532, a first plurality of tubes 534, the second flow straightener 540, a shell 542, a second plurality of tubes 544, the insert 550, an engagement structure 556, the sealing feature 560, and a stepped portion 522. Notwithstanding the foregoing, the fourth flow straightener assembly 520 defines engagement surface 554. The engagement surface 554 can be adapted for association with the screen feature 214. In this regard, the engagement surface 554 may be free of O-rings or other sealing features, and define a landing or seating for the screen feature 214 at or adjacent the inlet 204 of the housing 202. For example, the engagement surface 554 may be substantially flat or exhibit a planar structure. The fourth flow straightener assembly 520 can also include annular surface 555. As shown in FIG. 8A, the annular surface 555 can be a substantially smooth surface that allows the further flow straightener assembly 520 to slide into the housing 202 or other receiving structure of the nozzle assembly 200.

Figure 8B:
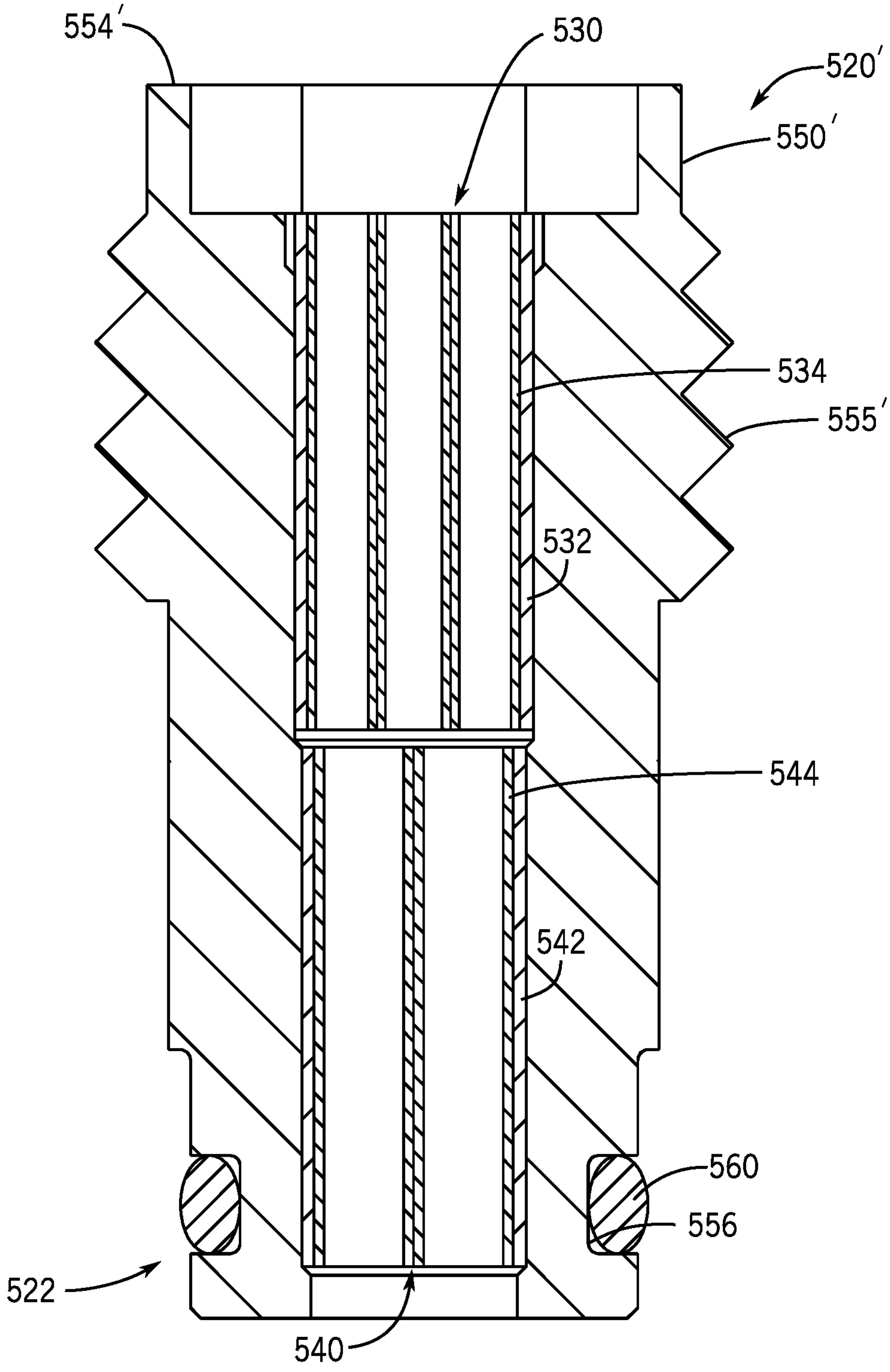
FIG. 8B depicts a cross-sectional view of another embodiment of the flow straightener assembly shown in FIG. 8A, taken along line 4-4 of FIG. 2.

In other examples, the fourth flow straightener assembly 520 can have various features that facilitate retention with the housing 202. In this regard, FIG. 8B shows a modified fourth flow straightener assembly 520'. The modified further flow straightener assembly 520' can include a modified engagement surface 554' and a modified annular surface 555' The modified engagement surface 554' as shown in FIG. 8B can be defined by an interface for a hex/Allen drive and/or other tool interface. The modified annular surface 555' can be defined by a threaded feature. In this regard, the modified annular surface 555' can be threadably associated with the housing 202, and the housing 202 can include corresponding or complementary threads to engage the modified fourth flow straightener assembly 520'. It will be appreciated that the modified engagement surface 554' and the modified annular surface 555' can be optional features of the modified fourth flow straightener assembly 520'. For example, in some cases, the modified fourth flow straightener assembly 520' can include the hex/Allen drive and the annular surface can be smooth and vice versa.

Figure 9:
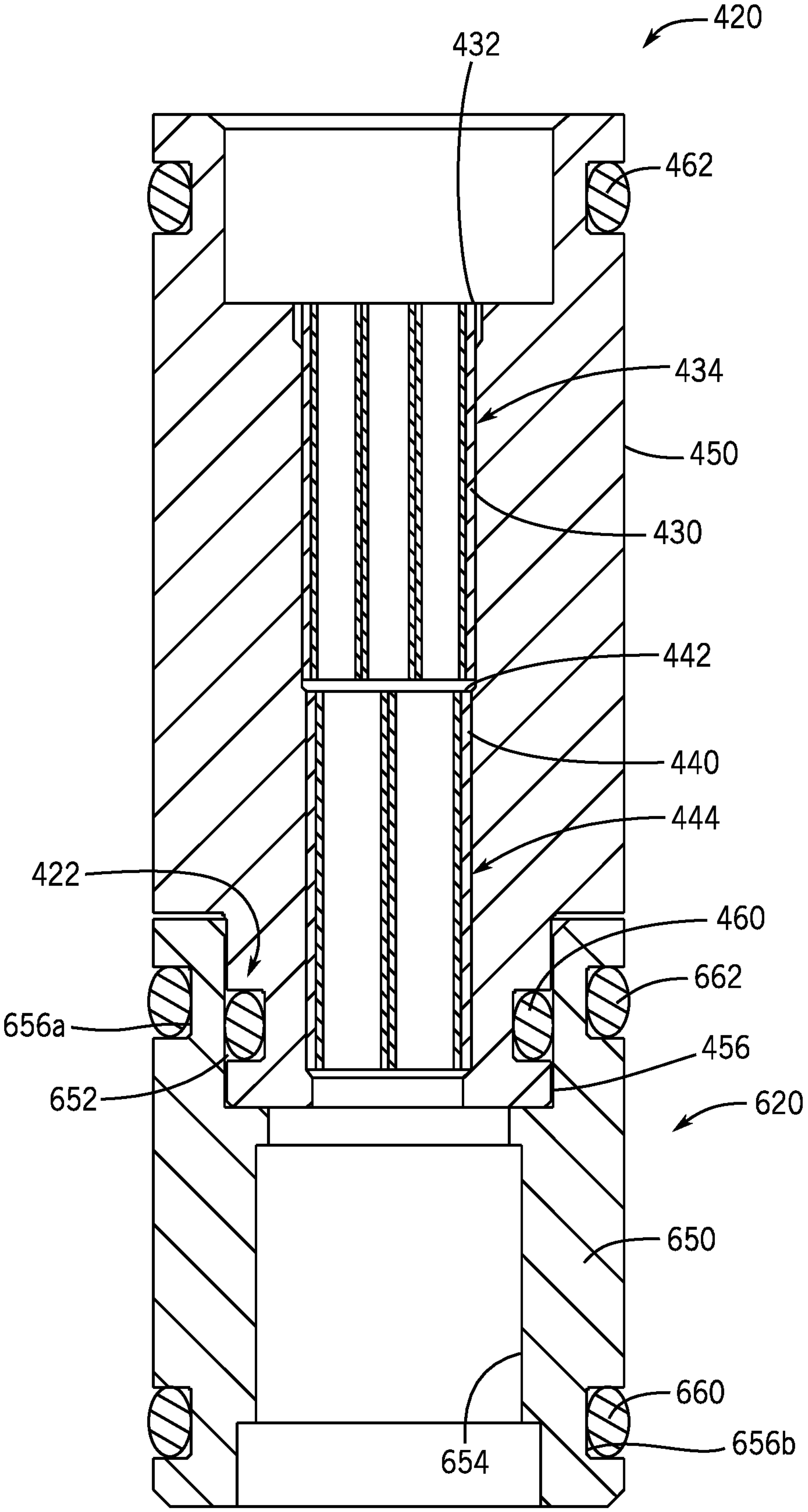
FIG. 9 depicts a cross-sectional view of a coupling and an associated flow straightener assembly, taken along line 4-4 of FIG. 2.

At least one of the flow straightener assemblies of the nozzle assembly 200 can be adapted to be arranged at or adjacent the outlet 206. For example, at least one of the flow straightener assemblies can be adapted to engage with the transition portion 650. With reference to FIG. 9, a cross-sectional view of the third flow straightener assembly 420 is shown, taken along 9-9 of FIG. 3. The third flow straightener assembly 420 can be substantially analogous to flow straightener assembly 220 and can include the first flow straightener 430, a shell 432, a first plurality of tubes 434, the second flow straightener 440, a shell 442, a second plurality of tubes 444, the insert 450, an engagement structure 456, the sealing feature 460, and a stepped portion 422.

In FIG. 9, the stepped portion 422 is shown associated with the transition portion 620. The transition portion 620 can be defined by a body having a receiving zone 652 at a first end, and a tip seating zone 654 at a second, opposing end. As shown in FIG. 9, the stepped portion 422 can be received substantially within the receiving zone 652. In this regard, the sealing feature 460 can be engaged in contacting relation with the transition portion 620 to establish a fluid-tight seal between the third flow straightener assembly 420 and the transition portion 620.

Also shown in FIG. 9, the transition portion 620 can define a first engagement structure **656*a* and a second engagement structure 656*b*. The first and second engagement structures 656*a*, 656*b* can be grooves or other features defined annularly about an exterior most surface of the body 552. The first and second sealing features 660, 662 can be seated within respective ones of the first and second engagement structures 656*a*, 656*b* and be used to establish a fluid tight seal with the housing 202 at the internal channel 208**.

Figure 10:
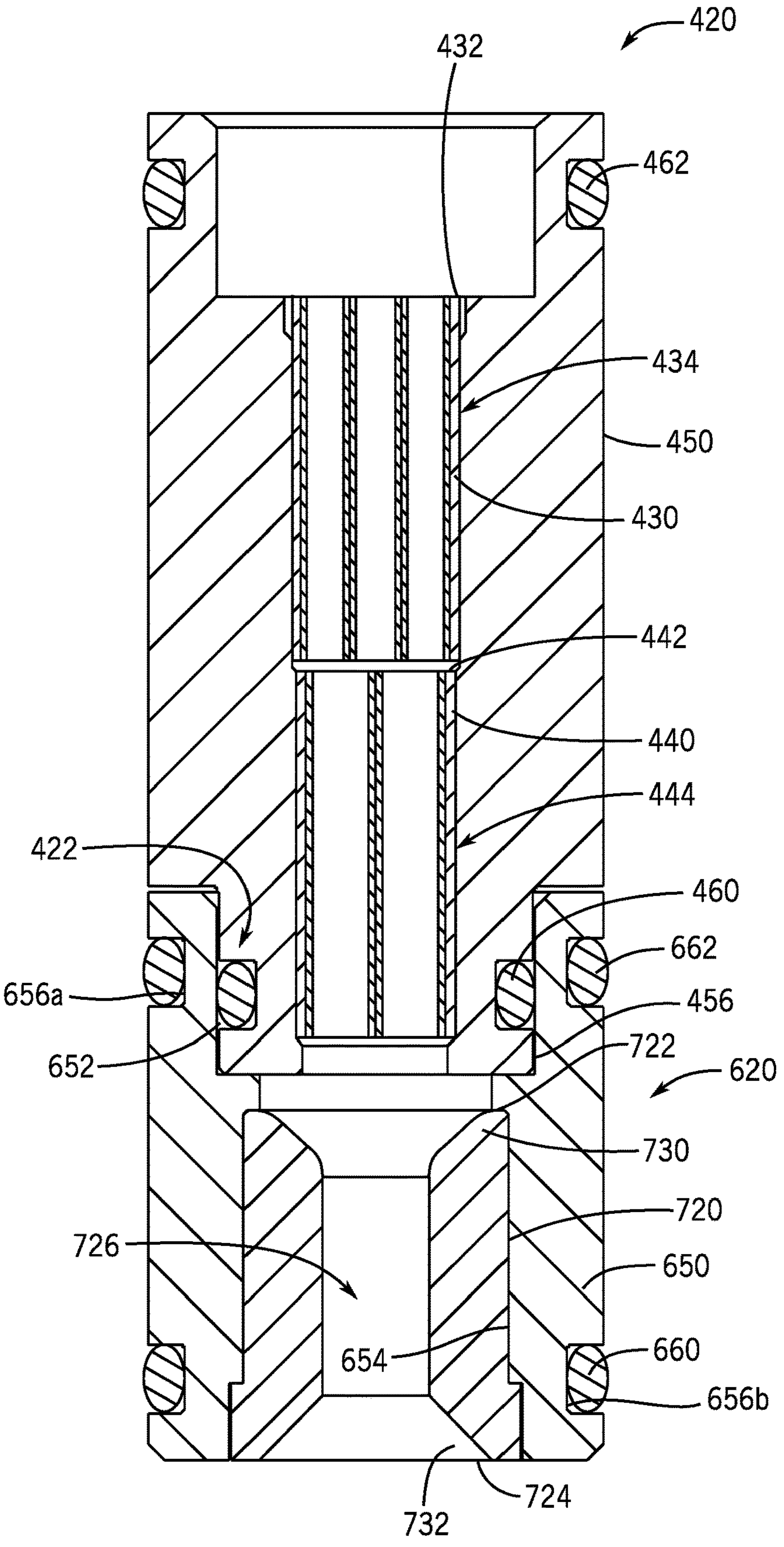
FIG. 10 depicts a cross-sectional view of the coupling and flow straightener assembly of FIG. 9 associated with a nozzle tip, taken along line 4-4 of FIG. 2.

Turning to FIG. 10, the third flow straightener assembly 420 and the transition portion 620 is shown associated with the tip 720. In particular, the tip 720 is insertable into the tip seating zone 654. The tip 720 can have a tip inlet 722 adjacent the third flow straightener assembly 420. The tip 720 can have a tip outlet 724 at the outlet 206 of the housing 202. Fluid flows through the nozzle assembly 200 and exits the nozzle assembly 200 via the tip outlet 724. In this regard, the tip 720 defines a tip channel 726 extending therethrough and substantially between the tip inlet 722 and the tip outlet 724. In FIG. 10, the tip inlet 722 is associated with a tapered region 730 that leads into the tip channel 726. The tapered region 730 may define a gradual reduction of the cross-sectional area of the fluid flow through the tip 720. Further, the tip outlet 724 is associated with a chamfered region 732 that extends from the tip channel 726. The chamfered region 732 may define a gradual increase in the cross-sectional area of the fluid flow through the tip 720. In this regard, while many constructions of the tip 720 are possible, the substantially rounded inlet can help facilitate the smooth transition of fluid into the tip. And further, the lead-out chamfer can, in combination with the inlet to the tip, produce a tight and intact flow that can maintain substantially laminar flow over prolonged distances, as described herein.

Figure 11:
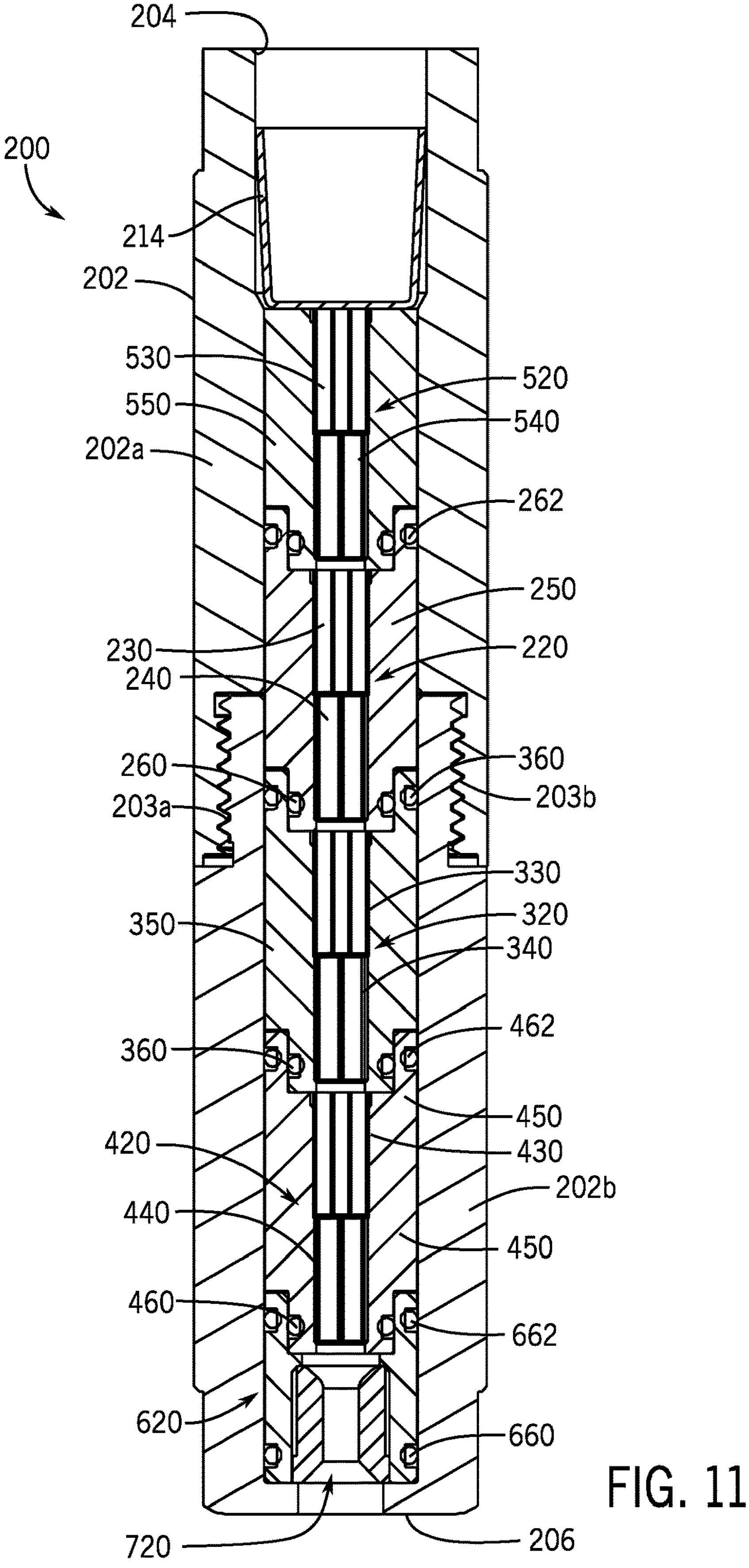
FIG. 11 depicts a cross-sectional view of the nozzle of FIG. 2 in an assembled configuration, taken along line 4-4 of FIG. 2.

At FIG. 11, a cross-sectional view of the nozzle assembly 200 is shown, taken along line 4-4 of FIG. 2. In FIG. 11, the nozzle assembly 200 is shown in a fully assembled configuration. In this regard, the housing portions **202*a* and 202*b* are removably attached to one another and define the internal channel 208. With the housing 202 at the internal channel 208, the screen feature 214, the flow straightener assemblies 220, 320, 420, 520, the transition portion 620, and the tip 720 are assembled. Fluid can be introduced at the inlet 204 and advance along a flow direction and traverse at least a portion of the screen feature 214, the flow straightener assemblies 220, 320, 420, 520, the transition portion 620, and the tip 720 as the fluid advances toward and exits the nozzle assembly 200 at the outlet 206**.

Figure 12:
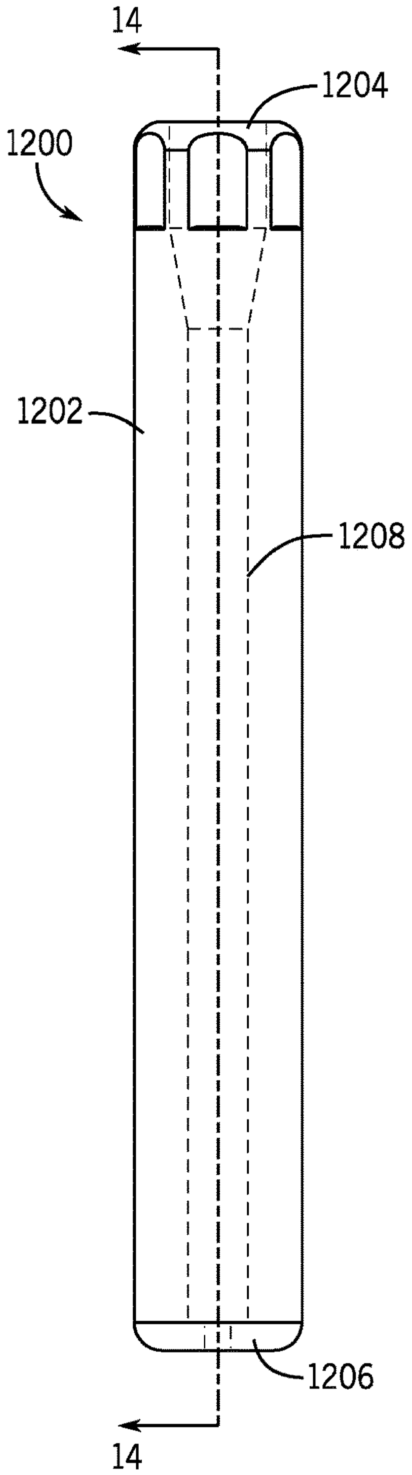
FIG. 12 depicts another implementation of a nozzle assembly.

Turning to FIG. 12, another implementation of a nozzle assembly 1200 is shown. The nozzle assembly 1200 can be substantially analogous to the nozzle assembly 106 described above with respect to FIGS. 1A-1C and/or the nozzle assembly 200 described above with respect to FIGS. 2-11. For example, the nozzle assembly 1200 can include collections of tubes arranged serially therein, and alternating in quantity, to produce and maintain a laminar flow.

In FIG. 12, the nozzle assembly 1200 is shown having a housing 1202. The housing 1202 can form an outer protective structure of the nozzle assembly 1200 that is arranged to route fluid toward and through the collections of tubes arranged therein. For example, the housing 1202 can define an inlet 1204 at a first end of the housing 1202 and an outlet 1206 at a second opposing end of the housing 1202. Broadly, the nozzle assembly 1200 can receive fluid at the inlet 1204 (e.g., via a conduit or other fluid supply) and can emit fluid at the outlet 1206. The housing 1202 can define an internal channel 1208 (shown in phantom in FIG. 12) between the inlet 1204 and the outlet 1206 for receiving the collections of tubes.

Figure 13:
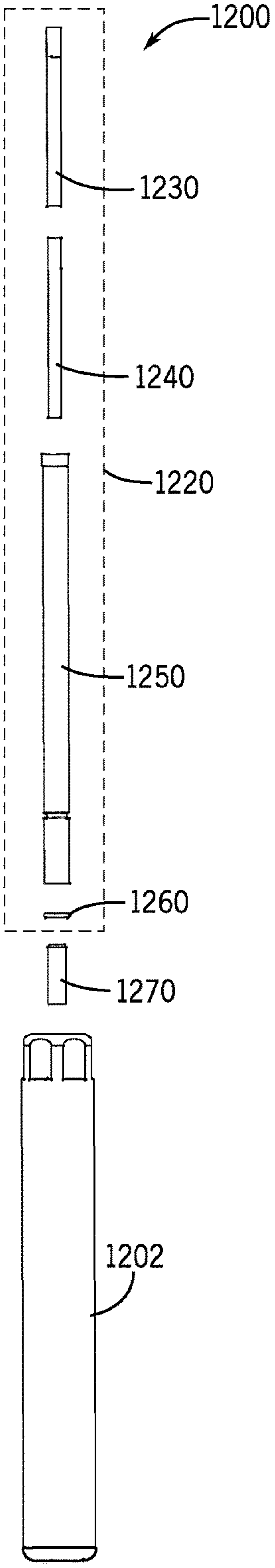
FIG. 13 depicts an exploded view of the nozzle assembly of FIG. 12.

With reference to FIG. 13, an exploded view of the nozzle assembly 1200 is shown. In FIG. 13, the nozzle assembly 1200 includes one flow straightener assembly that has an alternating series of elongated tubes arranged within the housing 1202. In this regard, the nozzle assembly 1200 is shown as including a flow straightener assembly 1220. The flow straightener assembly 1220 can be substantially analogous to the various flow straightener assemblies described herein, such as the flow straightener assemblies 220, 320, 420, 520, and thus the flow straightener assembly 1220 is shown in FIG. 13 as including a first flow straightener 1230, a second flow straightener 1240, an insert 1250, and a sealing feature 1260; redundant explanation of which is omitted here for clarity. The nozzle assembly 1200 is also shown with a tip 1270.

As described herein, the nozzle assembly 1200 can be adapted to receive fluid at the inlet 1204 and direction the flow to and through the flow straightener assembly 1220. For example, fluid can be directed to the first flow straightener 1230 that has a first plurality of elongated tubes and the second flow straightener 1240 that has a second plurality of elongated tubes different in quantity from the first plurality of tubes. The advancement of the fluid through the first and second flow straighteners 1230, 1240 can induce a substantially laminar flow that is maintainable, intact and at prolonged distances (e.g., the distance d of FIG. 1A). From the flow straightener assembly 1220, fluid can proceed to the tip 1270, through which fluid exits the nozzle assembly 1200.

Figure 14:
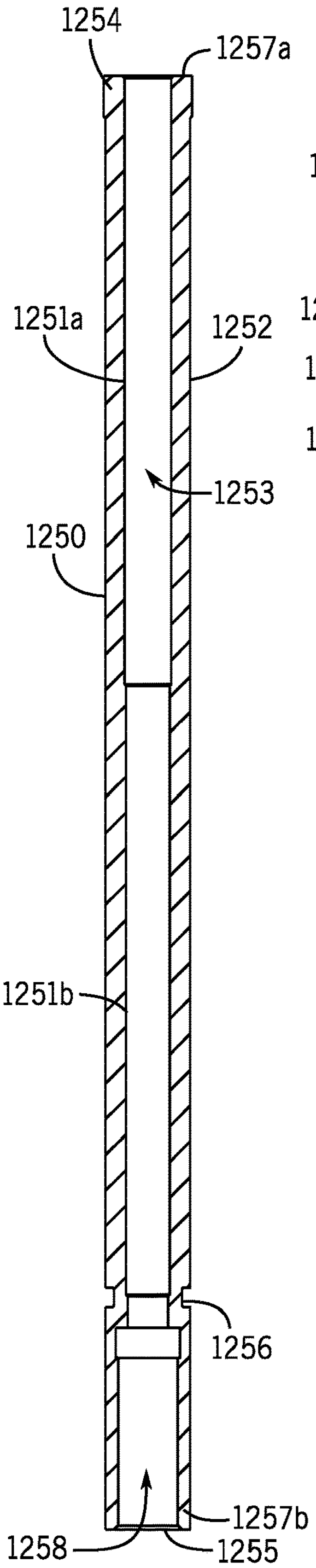
FIG. 14 depicts a cross-sectional view of an insert of the nozzle assembly, taken along line 14-14 of FIG. 12.

FIG. 14 depicts a cross-sectional view of an insert 1250 of the nozzle assembly, taken along line 14-14 of FIG. 12. The insert 1250 can be substantially analogous to the inserts described herein, such as the insert 250. For example, the insert 1250 can be used to receive the first and second flow straighteners 1230, 1240, and associate the flow straighteners 1230, 1240 with the housing 1202. In this regard, the insert 1250 is shown in FIG. 14 as including a body 1252, an internal channel 1253, a first end 1257*a*, a second end 1257*b*, a first section 1251*a*, a second section 1251*b*, an insert inlet 1254, an insert outlet 1255, and an engagement structure 1256.

Figure 15:
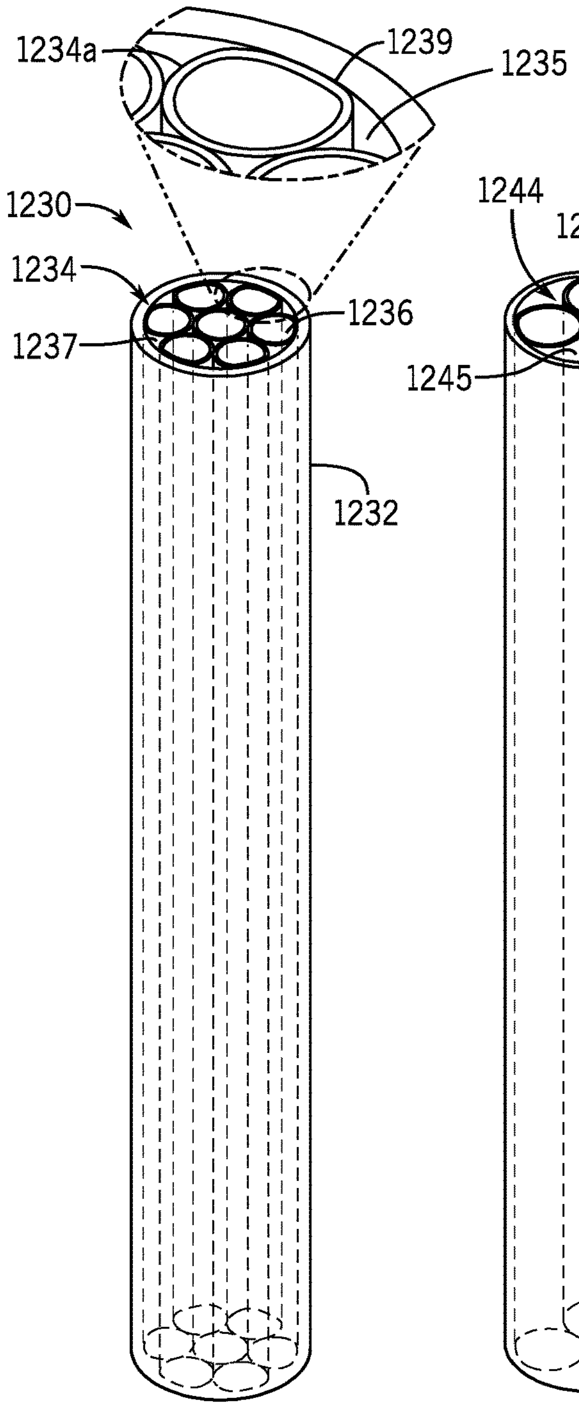
FIG. 15 depicts a first flow straightener having a first plurality of tubes arranged therein.

With reference to FIG. 15, the first flow straightener 1230 is shown. The first flow straightener 1230 can be substantially analogous to the flow straighteners described herein, such as the flow straightener 230. For example, the flow straightener 1230 can include a collection of ducts that are arranged to receive a fluid and induce a substantially laminar fluid flow therewith. In this regard, the flow straightener 1230 is shown in FIG. 15, as including a shell 1232, a first plurality of tubes 1234, a given tube 1234*a*, gaps 1235, a corresponding collection of ducts 1236, a shell interior 1237, and a connection 1239; redundant explanation of which is omitted here for clarity.

Notwithstanding the foregoing similarities, the first plurality of tubes 1234 can be substantially elongated members. For example, the first plurality of tubes 1234 can have a length that is substantially greater than a width of the nozzle assembly 1200. In some cases, the tubes 1234 can have a length that is at least 30%, of at least 40%, or of at least a greater percentage of a total length of the nozzle assembly 1200.

Figure 16:
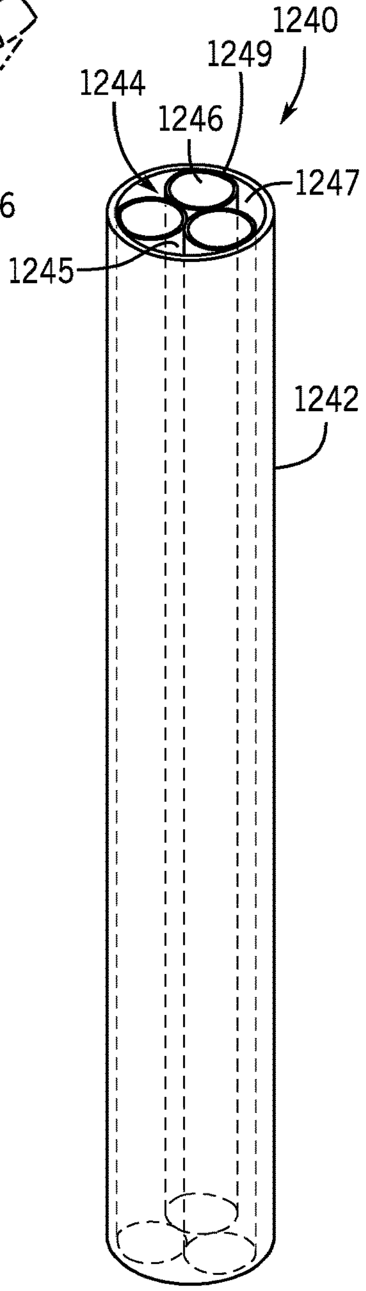
FIG. 16 depicts a second flow straightener having a second plurality of tubes arranged therein.

With reference to FIG. 16, the second flow straightener 1240 is shown. Similar to the first flow straightener 1230, the second flow straightener 1240 includes a shell 1242, a second plurality of tubes 1244, a second collection of ducts 1246, gaps 1245, a shell interior 1247, and a press-fit connection 1249. Notwithstanding, the second plurality of tubes 1244 includes a different quantity of tubes than the first plurality of tubes 1234. For example, the second plurality of tubes 1244 can include three separate tubes of thin-walled construction that are press fit into the shell 1242. Accordingly, whereas the first collection of ducts 1236 includes seven ducts, the second collection of ducts 1246 includes three ducts. In other cases, the second plurality of tubes 1234 and second collection of ducts 1246 can be defined by more than three tubes, including being defined by more than seven tubes, as may be appropriate for a given application.

Figure 17:
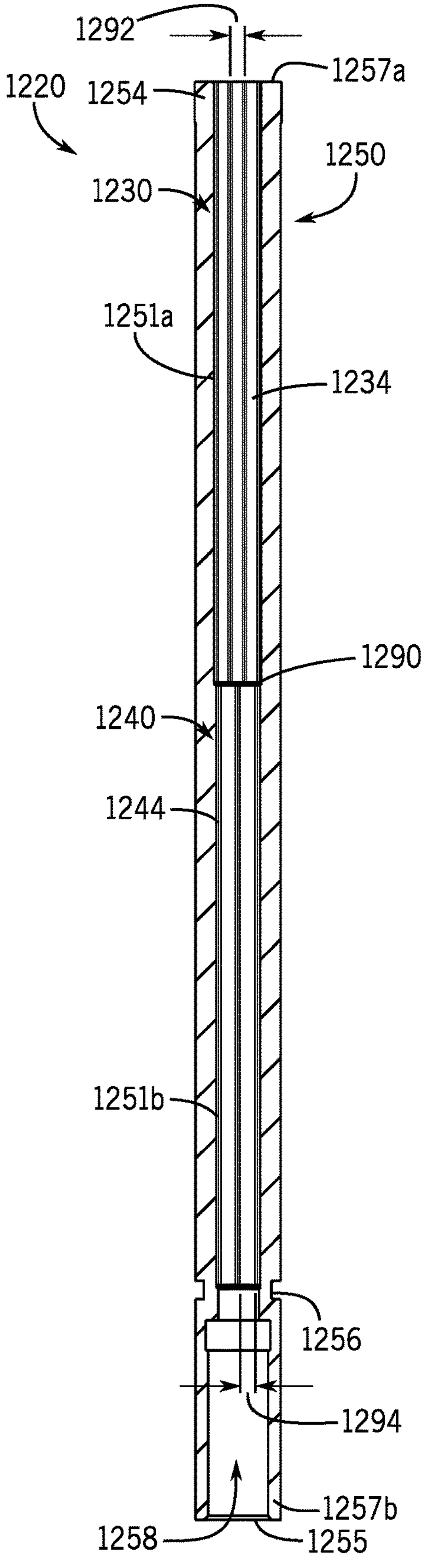
FIG. 17 depicts a cross-sectional view of a flow straightener assembly including the first flow straightener and the second flow straightener arranged within the insert taken along line 14-14 of FIG. 12.

Turning to FIG. 17, a cross-sectional view of the flow straightener assembly 1220 is shown, taken along line 14-14 of FIG. 12. In FIG. 17, the first flow straightener 1230 is arranged in the first section 1251*a* of the insert 1250. Further, the second flow straightener 1240 is arranged in the second section 1251*b* of the insert 1250. In the configuration of FIG. 17, the first and second flow straighteners 1230, 1240 can be arranged substantially adjacent one another within the internal channel 1253. The tubes of the first plurality of tubes 1234 can generally have a diameter 1292 and the tubes of the second plurality of tubes 1244 can generally have a diameter 1294. The diameter 1292 is less than the diameter 1294, for example, in order to accommodate seven distinct tubes within the shell 1232.

In the configuration, the first and second flow straighteners 1230, 1240 can be arranged at an interface 1290 within the insert 1250. At the interface 1290, the tubes of the first plurality of tubes 1234 are substantially discontinuous with the tubes of the second plurality of tubes 1244. In this regard, the interface 1290 can define a fluid boundary at which fluid flows within the insert 1250 traverses and transitions between flow straightener assemblies having different or alternating quantities of tubes.

Figure 18:
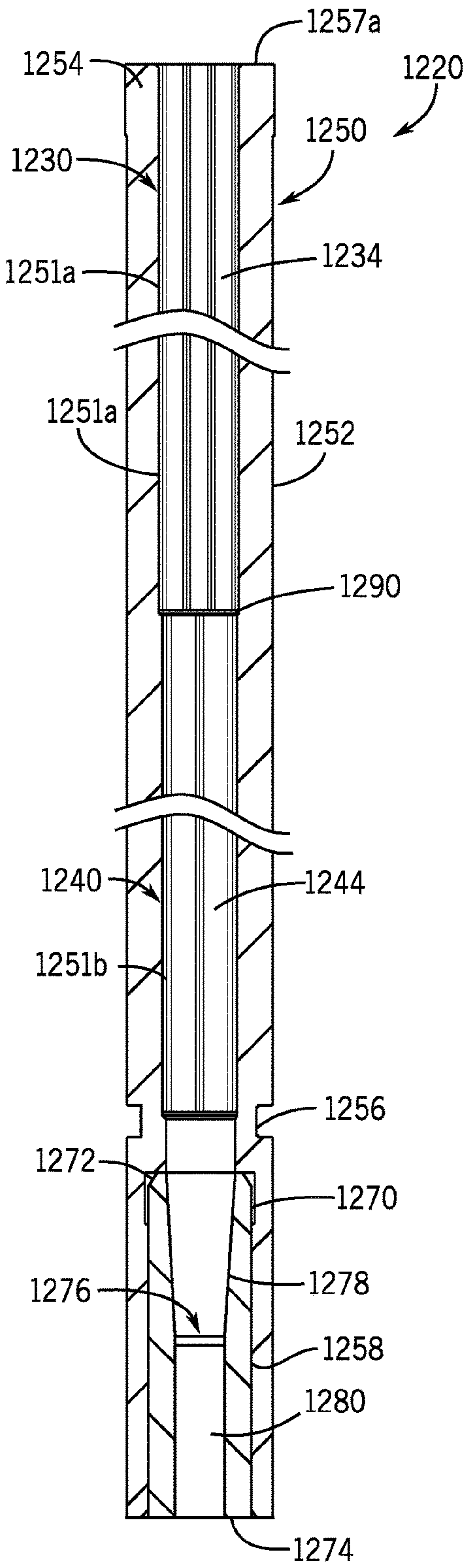
FIG. 18 depicts a cross-sectional view of the flow straightener assembly of FIG. 17 and an associated nozzle tip, taken along line 14-14 of FIG. 12.

FIG. 18 depicts a cross-sectional view of the flow straightener assembly of FIG. 17 assembly and the tip 1270, taken along line 14-14 of FIG. 12. The tip 1270 is shown in FIG. 18 arranged in a tip receiving zone 1258 of the insert 1250. The tip 1270 can have a tip inlet 1272 adjacent the flow straightener assembly 1220. The tip 1270 can have a tip outlet 1274 at the outlet 1206. Fluid can flow through the nozzle assembly 1200 and exit the nozzle assembly 1200 via the tip outlet 1274. In this regard, the tip 1270 defines a tip channel 1276 extending therethrough and substantially between the tip inlet 1272 and the tip outlet 1274. In FIG. 18, the tip inlet 1272 is associated with a tapered region 1278 of the tip channel 1276. The tapered region 1278 may define a gradual reduction of the cross-sectional area of the fluid flow through the tip 1270. Further, the tip outlet 1274 is associated with a cylindrical region 1280 of the tip channel 1276. The cylindrical region 1280 may have a substantially uniform cross-sectional area through the tip 1270. In this regard, while many constructions of the tip 1270 are possible, the substantially rounded inlet can help facilitate the smooth transition of fluid into the tip 1270.

Figure 19:
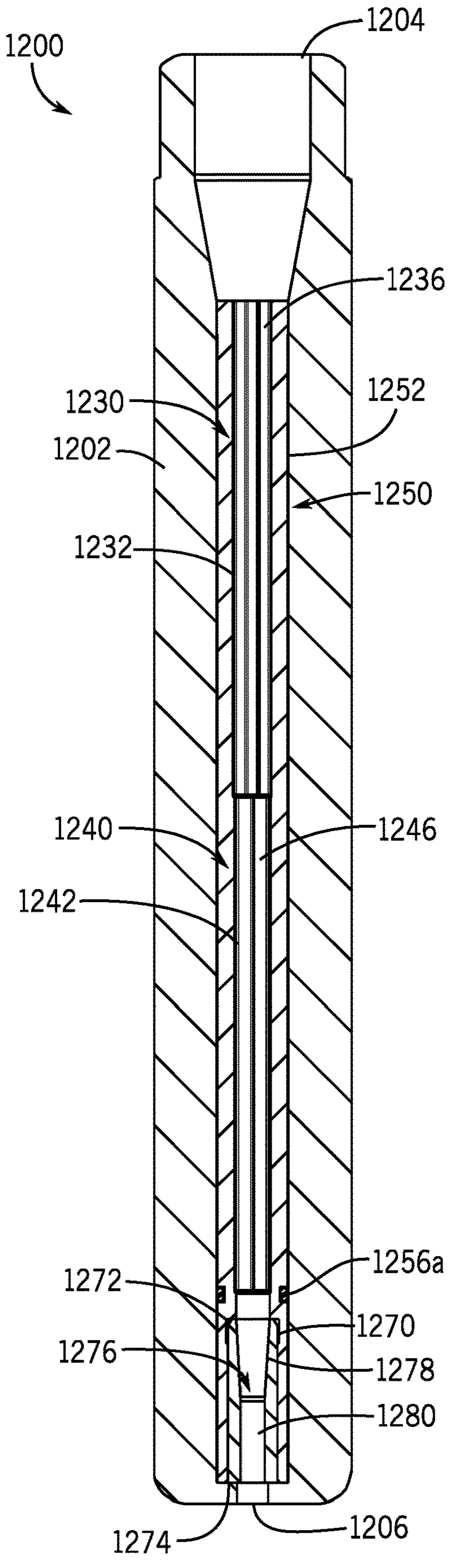
FIG. 19 depicts a cross-sectional view of the nozzle of FIG. 12 in an assembled configuration, taken along line 14-14 of FIG. 12.

At FIG. 19, a cross-sectional view of the nozzle assembly 1200 is shown, taken along line 14-14 of FIG. 12. In FIG. 12, the nozzle assembly 1200 is shown in a fully assembled configuration. Within the housing 1202 at the internal channel 1208, the flow straightener assembly 1220 and the tip 1270 are assembled. Fluid can be introduced at the inlet 1204 and advance along a flow direction and traverse at least a portion of the flow straightener assembly 1220, and the tip 1270 as the fluid advances toward and exits the nozzle assembly 1200 at the outlet 1206.

The flow straighteners in the nozzle assemblies of the present disclosure, e.g., 200, 1200, may be axially aligned and the internal diameters of the flow straighteners may be the same as one another, and may facilitate producing a laminar flow. In implementations where multiple inserts are provided in the nozzle assemblies, the internal diameter at the ingress and/or egress of the insert may be the same as the internal diameter of the flow straighteners in order to provide a nozzle assembly with a fluid pathway having a constant internal diameter at the region containing the flow straighteners and up to the transition portion 620 and/or tip 720, 1270, for example.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A nozzle assembly comprising:

a housing defining an exterior of the nozzle assembly, the housing having an inlet, an outlet, and an internal channel extending between the inlet and the outlet along an axis of the housing;

a first flow straightener assembly extending along the axis and secured within the internal channel, the first flow straightener assembly having a first insert receivable within the internal channel, a first shell seated within the first insert and having a first plurality of tubes arranged therein and fluidly connected to the inlet, and a second shell seated within the first insert and having a second plurality of tubes arranged therein and fluidly connected to the first plurality of tubes, wherein a quantity of the first plurality of tubes is different than a quantity of the second plurality of tubes; and a second flow straightener assembly extending along the axis and secured within the internal channel, the second flow straightener assembly having a second insert receivable within the internal channel, a third shell seated within the second insert having a third plurality of tubes arranged therein and fluidly connected to the second plurality of tubes, and a fourth shell seated within the second insert and having a fourth plurality of tubes arranged therein and fluidly coupled the third plurality of tubes and the outlet, wherein a quantity of the third plurality of tubes is different than a quantity of the fourth plurality of tubes, and wherein the first insert and the second insert each define a receiving structure for axially aligning the first and second flow straightener assemblies with one another and within the housing.

2. The nozzle assembly of claim 1, wherein the quantity of the first plurality of tubes is greater than the quantity of the second plurality of tubes.

3. The nozzle assembly of claim 1, wherein:

the first plurality of tubes comprises seven tubes, and the second plurality of tubes comprises three tubes.

4. The nozzle assembly of claim 1, wherein:

the first plurality of tubes comprises a series of thin-walled tubes press fit into a hollow interior of the first shell, and the second plurality of tubes comprises a series of thin-walled tubes press fit into a hollow interior of the second shell.

5. The nozzle assembly of claim 1, wherein:

the nozzle assembly defines an elongated region between the inlet and the outlet, the first insert is an elongated insert with a first end at or adjacent to the inlet and a second end at or adjacent the second insert, and the second insert is an elongated insert with a first end at or adjacent to the second end of the first insert and a second end at or adjacent the outlet.

6. The nozzle assembly of claim 5, wherein a length of one or more of the first, second, third and fourth shells and associated plurality of tubes along the elongated region is substantially greater than a width of the nozzle assembly along the elongated region.

7. The nozzle assembly of claim 1, wherein the quantity of the first plurality of tubes is the same as the quantity of the third plurality of tubes.

8. The nozzle assembly of claim 7, wherein the quantity of the second plurality of tubes is the same as the quantity of the fourth plurality of tubes.

9. The nozzle assembly of claim 1, wherein the first and second flow straightener assemblies define complementary engagement structures for fluidly associating the first and second plurality of tubes of the first flow straightener assembly with the third and fourth plurality of tubes of the second flow straightener assembly.

10. The nozzle assembly of claim 9, further comprising a sealing feature associated with the complementary engagement structures for establishing a fluid-tight fit between the first and second flow straightener assemblies.

11. The nozzle assembly of claim 1, wherein the nozzle assembly further comprises a tip fluidly associated with the fourth plurality of tubes and configured to deliver a stream of laminar fluid flow through the outlet.

12. The nozzle assembly of claim 11, wherein the stream of laminar fluid flow is maintained for at least 20 feet from the outlet.

13. The nozzle assembly of claim 12, wherein the stream of laminar fluid flow is delivered to the outlet at a pressure of up to 2,500 pounds per square inch (psi) and a flow rate of up to 25 gallons per minute (gpm).

* * * * *